US009996741B2

(12) United States Patent
Amtrup et al.

(10) Patent No.: US 9,996,741 B2
(45) Date of Patent: Jun. 12, 2018

(54) SYSTEMS AND METHODS FOR CLASSIFYING OBJECTS IN DIGITAL IMAGES CAPTURED USING MOBILE DEVICES

(71) Applicant: Kofax, Inc., Irvine, CA (US)

(72) Inventors: Jan W. Amtrup, Silver Spring, MD (US); Anthony Macciola, Irvine, CA (US); Steve Thompson, Oceanside, CA (US); Jiyong Ma, San Diego, CA (US); Alexander Shustorovich, Pittsford, NY (US); Christopher W. Thrasher, Rochester, NY (US)

(73) Assignee: KOFAX, INC., Irvine, CA (US)

( * ) Notice: Subject to any disclaimer, the term of this patent is extended or adjusted under 35 U.S.C. 154(b) by 148 days.

(21) Appl. No.: 15/157,325

(22) Filed: May 17, 2016

(65) Prior Publication Data

US 2016/0259973 A1    Sep. 8, 2016

Related U.S. Application Data

(63) Continuation of application No. 13/802,226, filed on Mar. 13, 2013, now Pat. No. 9,355,312.

(51) Int. Cl.
*G06K 9/00* (2006.01)
*G06K 9/22* (2006.01)
(Continued)

(52) U.S. Cl.
CPC ..... *G06K 9/00456* (2013.01); *G06K 9/00442* (2013.01); *G06K 9/00449* (2013.01);
(Continued)

(58) Field of Classification Search
None
See application file for complete search history.

(56) References Cited

U.S. PATENT DOCUMENTS

| 1,660,102 A | 2/1928 | Appelt et al. |
| 3,069,654 A | 12/1962 | Hough |

(Continued)

FOREIGN PATENT DOCUMENTS

| CN | 101052991 A | 10/2007 |
| CN | 101339566 A | 1/2009 |

(Continued)

OTHER PUBLICATIONS

Extended European Search Report from European Application No. 14773721.7, dated May 17, 2016.
(Continued)

*Primary Examiner* — Utpal Shah
(74) *Attorney, Agent, or Firm* — Zilka-Kotab, P.C.

(57) ABSTRACT

In one embodiment, a method includes receiving a digital image captured by a mobile device; and using a processor of the mobile device: generating a first representation of the digital image, the first representation being characterized by a reduced resolution; generating a first feature vector based on the first representation; comparing the first feature vector to a plurality of reference feature matrices; classifying an object depicted in the digital image as a member of a particular object class based at least in part on the comparing; and determining one or more object features of the object based at least in part on the particular object class. Corresponding systems and computer program products are also disclosed.

17 Claims, 6 Drawing Sheets

(51) Int. Cl.
*G06K 9/62* (2006.01)
*G06K 9/18* (2006.01)
*G06K 9/32* (2006.01)
*G06K 9/36* (2006.01)

(52) U.S. Cl.
CPC ........... *G06K 9/00469* (2013.01); *G06K 9/18* (2013.01); *G06K 9/228* (2013.01); *G06K 9/325* (2013.01); *G06K 9/6202* (2013.01); *G06K 9/6269* (2013.01); *G06K 2009/363* (2013.01)

(56) References Cited

U.S. PATENT DOCUMENTS

| | | |
|---|---|---|
| 3,696,599 A | 10/1972 | Palmer et al. |
| 4,558,461 A | 12/1985 | Schlang |
| 4,651,287 A | 3/1987 | Tsao |
| 4,656,665 A | 4/1987 | Pennebaker |
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,101,448 A | 3/1992 | Kawachiya et al. |
| 5,124,810 A | 6/1992 | Seto |
| 5,151,260 A | 9/1992 | Contursi et al. |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,293,429 A | 3/1994 | Pizano et al. |
| 5,313,527 A | 5/1994 | Guberman et al. |
| 5,317,646 A | 5/1994 | Sang, Jr. et al. |
| 5,321,770 A | 6/1994 | Huttenlocher et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,586,199 A | 12/1996 | Kanda et al. |
| 5,594,815 A | 1/1997 | Fast et al. |
| 5,596,655 A | 1/1997 | Lopez |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,680,525 A | 10/1997 | Sakai et al. |
| 5,696,611 A | 12/1997 | Nishimura et al. |
| 5,696,805 A | 12/1997 | Gaborski et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,760,912 A | 6/1998 | Itoh |
| 5,781,665 A | 7/1998 | Cullen et al. |
| 5,818,978 A | 10/1998 | Al-Hussein |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,857,029 A | 1/1999 | Patel |
| 5,867,264 A | 2/1999 | Hinnrichs |
| 5,899,978 A | 5/1999 | Irwin |
| 5,923,763 A | 7/1999 | Walker et al. |
| 5,937,084 A | 8/1999 | Crabtree et al. |
| 5,953,388 A | 9/1999 | Walnut et al. |
| 5,956,468 A | 9/1999 | Ancin |
| 5,987,172 A | 11/1999 | Michael |
| 6,002,489 A | 12/1999 | Murai et al. |
| 6,005,958 A | 12/1999 | Farmer et al. |
| 6,005,968 A | 12/1999 | Granger |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,052,124 A | 4/2000 | Stein et al. |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,094,198 A | 7/2000 | Shashua |
| 6,098,065 A | 8/2000 | Skillen et al. |
| 6,104,830 A | 8/2000 | Schistad |
| 6,104,840 A | 8/2000 | Ejiri et al. |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,215,469 B1 | 4/2001 | Mori et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,396,599 B1 | 5/2002 | Patton et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,426,806 B2 | 7/2002 | Melen |
| 6,433,896 B1 | 8/2002 | Ueda et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,571,008 B1 | 5/2003 | Bandyopadhyay et al. |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,628,808 B1 | 9/2003 | Bach et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,729,733 B1 | 5/2004 | Raskar et al. |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |

(56) References Cited

U.S. PATENT DOCUMENTS

| | | |
|---|---|---|
| 6,765,685 B1 | 7/2004 | Yu |
| 6,778,684 B1 | 8/2004 | Bollman |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,816,187 B1 | 11/2004 | Iwai et al. |
| 6,826,311 B2 | 11/2004 | Wilt |
| 6,831,755 B1 | 12/2004 | Narushima et al. |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 6,999,625 B1 * | 2/2006 | Nelson ............. G06K 9/50 382/103 |
| 7,006,707 B2 | 2/2006 | Peterson |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,107,285 B2 | 9/2006 | von Kaenel et al. |
| 7,123,292 B1 | 10/2006 | Seeger et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,149,347 B1 | 12/2006 | Wnek |
| 7,167,281 B1 | 1/2007 | Fujimoto et al. |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,286,177 B2 | 10/2007 | Cooper |
| 7,298,897 B1 | 11/2007 | Dominguez et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,542,931 B2 | 6/2009 | Black et al. |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,636,479 B2 | 12/2009 | Luo et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,702,162 B2 | 4/2010 | Cheong et al. |
| 7,735,721 B1 | 6/2010 | Ma et al. |
| 7,738,730 B2 | 6/2010 | Hawley |
| 7,739,127 B1 | 6/2010 | Hall |
| 7,761,391 B2 * | 7/2010 | Schmidtler .......... G06N 99/005 706/12 |
| 7,778,457 B2 | 8/2010 | Nepomniachtchi et al. |
| 7,782,384 B2 | 8/2010 | Kelly |
| 7,787,695 B2 | 8/2010 | Nepomniachtchi et al. |
| 7,937,345 B2 | 5/2011 | Schmidtler et al. |
| 7,941,744 B2 | 5/2011 | Oppenlander et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,035,641 B1 | 10/2011 | O'Donnell |
| 8,059,888 B2 | 11/2011 | Chen et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,081,227 B1 | 12/2011 | Kim et al. |
| 8,094,976 B2 | 1/2012 | Berard et al. |
| 8,126,924 B1 | 2/2012 | Herin |
| 8,135,656 B2 | 3/2012 | Evanitsky |
| 8,136,114 B1 | 3/2012 | Gailloux et al. |
| 8,184,156 B2 | 5/2012 | Mino et al. |
| 8,194,965 B2 | 6/2012 | Lossev et al. |
| 8,213,687 B2 | 7/2012 | Fan |
| 8,238,880 B2 | 8/2012 | Jin et al. |
| 8,239,335 B2 | 8/2012 | Schmidtler et al. |
| 8,244,031 B2 | 8/2012 | Cho et al. |
| 8,265,422 B1 | 9/2012 | Jin |
| 8,279,465 B2 | 10/2012 | Couchman |
| 8,295,599 B2 | 10/2012 | Katougi et al. |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,433,775 B2 | 4/2013 | Buchhop et al. |
| 8,441,548 B1 * | 5/2013 | Nechyba .............. H04N 5/228 348/222.1 |
| 8,443,286 B2 | 5/2013 | Cameron |
| 8,452,098 B2 | 5/2013 | Nepomniachtchi et al. |

(56) References Cited

U.S. PATENT DOCUMENTS

| | | | |
|---|---|---|---|
| 8,478,052 B1* | 7/2013 | Yee | G06K 9/4676 382/155 |
| 8,483,473 B2 | 7/2013 | Roach et al. | |
| 8,503,797 B2 | 8/2013 | Turkelson et al. | |
| 8,515,163 B2 | 8/2013 | Cho et al. | |
| 8,515,208 B2 | 8/2013 | Minerich | |
| 8,526,739 B2 | 9/2013 | Schmidtler et al. | |
| 8,532,374 B2 | 9/2013 | Chen et al. | |
| 8,532,419 B2 | 9/2013 | Coleman | |
| 8,553,984 B2 | 10/2013 | Slotine et al. | |
| 8,559,766 B2 | 10/2013 | Tilt et al. | |
| 8,577,118 B2 | 11/2013 | Nepomniachtchi et al. | |
| 8,582,862 B2 | 11/2013 | Nepomniachtchi et al. | |
| 8,587,818 B2 | 11/2013 | Imaizumi et al. | |
| 8,620,058 B2 | 12/2013 | Nepomniachtchi et al. | |
| 8,620,078 B1 | 12/2013 | Chapleau et al. | |
| 8,639,621 B1 | 1/2014 | Ellis et al. | |
| 8,675,953 B1 | 3/2014 | Elwell et al. | |
| 8,676,165 B2 | 3/2014 | Cheng et al. | |
| 8,677,249 B2 | 3/2014 | Buttner et al. | |
| 8,681,150 B2 | 3/2014 | Kim et al. | |
| 8,693,043 B2 | 4/2014 | Schmidtler et al. | |
| 8,705,836 B2 | 4/2014 | Gorski et al. | |
| 8,719,197 B2 | 5/2014 | Schmidtler et al. | |
| 8,745,488 B1 | 6/2014 | Wong | |
| 8,749,839 B2 | 6/2014 | Borrey et al. | |
| 8,774,516 B2 | 7/2014 | Amtrup et al. | |
| 8,805,125 B1 | 8/2014 | Kumar et al. | |
| 8,811,751 B1 | 8/2014 | Ma et al. | |
| 8,813,111 B2* | 8/2014 | Guerin | A63F 13/10 382/190 |
| 8,823,991 B2 | 9/2014 | Borrey et al. | |
| 8,855,375 B2 | 10/2014 | Macciola et al. | |
| 8,855,425 B2 | 10/2014 | Schmidtler et al. | |
| 8,879,120 B2 | 11/2014 | Thrasher et al. | |
| 8,879,783 B1 | 11/2014 | Wang et al. | |
| 8,879,846 B2 | 11/2014 | Amtrup et al. | |
| 8,885,229 B1 | 11/2014 | Amtrup et al. | |
| 8,908,977 B2 | 12/2014 | King | |
| 8,955,743 B1 | 2/2015 | Block et al. | |
| 8,971,587 B2 | 3/2015 | Macciola et al. | |
| 8,989,515 B2 | 3/2015 | Shustorovich et al. | |
| 8,995,012 B2 | 3/2015 | Heit et al. | |
| 8,995,769 B2 | 3/2015 | Carr | |
| 9,020,432 B2 | 4/2015 | Matsushita et al. | |
| 9,058,515 B1 | 6/2015 | Amtrup et al. | |
| 9,058,580 B1 | 6/2015 | Amtrup et al. | |
| 9,064,316 B2 | 6/2015 | Eid et al. | |
| 9,117,117 B2 | 8/2015 | Macciola et al. | |
| 9,129,210 B2 | 9/2015 | Borrey et al. | |
| 9,135,277 B2 | 9/2015 | Petrou | |
| 9,137,417 B2 | 9/2015 | Macciola et al. | |
| 9,141,926 B2 | 9/2015 | Kilby et al. | |
| 9,158,967 B2 | 10/2015 | Shustorovich et al. | |
| 9,165,187 B2 | 10/2015 | Macciola et al. | |
| 9,165,188 B2 | 10/2015 | Thrasher et al. | |
| 9,183,224 B2 | 11/2015 | Petrou et al. | |
| 9,208,536 B2 | 12/2015 | Macciola et al. | |
| 9,239,713 B1 | 1/2016 | Lakshman et al. | |
| 9,251,614 B1 | 2/2016 | Tian | |
| 9,253,349 B2 | 2/2016 | Amtrup et al. | |
| 9,275,281 B2 | 3/2016 | Macciola | |
| 9,311,531 B2 | 4/2016 | Amtrup et al. | |
| 9,342,741 B2 | 5/2016 | Amtrup et al. | |
| 9,342,742 B2 | 5/2016 | Amtrup et al. | |
| 9,355,312 B2 | 5/2016 | Amtrup et al. | |
| 9,367,899 B1 | 6/2016 | Fang | |
| 9,373,057 B1 | 6/2016 | Erhan et al. | |
| 9,386,235 B2 | 7/2016 | Ma et al. | |
| 9,405,772 B2 | 8/2016 | Petrou et al. | |
| 9,483,794 B2 | 11/2016 | Amtrup et al. | |
| 9,514,357 B2 | 12/2016 | Macciola et al. | |
| 9,576,272 B2 | 2/2017 | Macciola et al. | |
| 9,584,729 B2 | 2/2017 | Amtrup et al. | |
| 9,648,297 B1 | 5/2017 | Ettinger et al. | |
| 9,747,504 B2 | 8/2017 | Ma et al. | |
| 9,754,164 B2 | 9/2017 | Macciola et al. | |
| 9,760,788 B2 | 9/2017 | Shustorovich et al. | |
| 9,767,354 B2 | 9/2017 | Thompson et al. | |
| 9,767,379 B2 | 9/2017 | Macciola et al. | |
| 9,769,354 B2 | 9/2017 | Thrasher et al. | |
| 9,779,296 B1 | 10/2017 | Ma et al. | |
| 9,819,825 B2 | 11/2017 | Amtrup et al. | |
| 9,934,433 B2 | 4/2018 | Thompson et al. | |
| 2001/0027420 A1 | 10/2001 | Boublik et al. | |
| 2002/0030831 A1 | 3/2002 | Kinjo | |
| 2002/0054693 A1 | 5/2002 | Elmenhurst | |
| 2002/0069218 A1 | 6/2002 | Sull et al. | |
| 2002/0113801 A1 | 8/2002 | Reavy et al. | |
| 2002/0122071 A1 | 9/2002 | Camara et al. | |
| 2002/0126313 A1 | 9/2002 | Namizuka | |
| 2002/0165717 A1 | 11/2002 | Solmer et al. | |
| 2003/0002068 A1 | 1/2003 | Constantin et al. | |
| 2003/0007683 A1 | 1/2003 | Wang et al. | |
| 2003/0026479 A1 | 2/2003 | Thomas et al. | |
| 2003/0030638 A1 | 2/2003 | Astrom et al. | |
| 2003/0044012 A1 | 3/2003 | Eden | |
| 2003/0046445 A1 | 3/2003 | Witt et al. | |
| 2003/0053696 A1 | 3/2003 | Schmidt et al. | |
| 2003/0063213 A1 | 4/2003 | Poplin | |
| 2003/0086615 A1 | 5/2003 | Dance et al. | |
| 2003/0095709 A1 | 5/2003 | Zhou | |
| 2003/0101161 A1 | 5/2003 | Ferguson et al. | |
| 2003/0117511 A1 | 6/2003 | Belz et al. | |
| 2003/0120653 A1 | 6/2003 | Brady et al. | |
| 2003/0142328 A1 | 7/2003 | McDaniel et al. | |
| 2003/0151674 A1 | 8/2003 | Lin | |
| 2003/0156201 A1 | 8/2003 | Zhang | |
| 2003/0197063 A1 | 10/2003 | Longacre | |
| 2003/0210428 A1 | 11/2003 | Bevlin et al. | |
| 2003/0223615 A1 | 12/2003 | Keaton et al. | |
| 2004/0019274 A1 | 1/2004 | Galloway et al. | |
| 2004/0021909 A1 | 2/2004 | Kikuoka | |
| 2004/0022437 A1 | 2/2004 | Beardsley | |
| 2004/0022439 A1 | 2/2004 | Beardsley | |
| 2004/0049401 A1 | 3/2004 | Carr et al. | |
| 2004/0083119 A1 | 4/2004 | Schunder et al. | |
| 2004/0090458 A1 | 5/2004 | Yu et al. | |
| 2004/0093119 A1 | 5/2004 | Gunnarsson et al. | |
| 2004/0102989 A1 | 5/2004 | Jang et al. | |
| 2004/0111453 A1 | 6/2004 | Harris et al. | |
| 2004/0143547 A1 | 7/2004 | Mersky | |
| 2004/0143796 A1 | 7/2004 | Lerner et al. | |
| 2004/0169873 A1 | 9/2004 | Nagarajan | |
| 2004/0169889 A1 | 9/2004 | Sawada | |
| 2004/0175033 A1 | 9/2004 | Matama | |
| 2004/0181482 A1 | 9/2004 | Yap | |
| 2004/0190019 A1 | 9/2004 | Li et al. | |
| 2004/0223640 A1 | 11/2004 | Bovyrin | |
| 2004/0245334 A1* | 12/2004 | Sikorski | G06F 1/1626 235/383 |
| 2004/0252190 A1 | 12/2004 | Antonis | |
| 2004/0261084 A1 | 12/2004 | Rosenbloom et al. | |
| 2004/0263639 A1 | 12/2004 | Sadovsky et al. | |
| 2005/0021360 A1 | 1/2005 | Miller et al. | |
| 2005/0030602 A1 | 2/2005 | Gregson et al. | |
| 2005/0046887 A1 | 3/2005 | Shibata et al. | |
| 2005/0050060 A1 | 3/2005 | Damm et al. | |
| 2005/0054342 A1 | 3/2005 | Otsuka | |
| 2005/0060162 A1 | 3/2005 | Mohit et al. | |
| 2005/0063585 A1 | 3/2005 | Matsuura | |
| 2005/0065903 A1 | 3/2005 | Zhang et al. | |
| 2005/0080844 A1 | 4/2005 | Dathathraya et al. | |
| 2005/0100209 A1 | 5/2005 | Lewis et al. | |
| 2005/0131780 A1 | 6/2005 | Princen | |
| 2005/0134935 A1 | 6/2005 | Schmidtler et al. | |
| 2005/0141777 A1 | 6/2005 | Kuwata | |
| 2005/0151990 A1 | 7/2005 | Ishikawa et al. | |
| 2005/0160065 A1 | 7/2005 | Seeman | |
| 2005/0180628 A1 | 8/2005 | Curry et al. | |
| 2005/0180632 A1 | 8/2005 | Aradhye et al. | |
| 2005/0193325 A1 | 9/2005 | Epstein | |
| 2005/0204058 A1 | 9/2005 | Philbrick et al. | |
| 2005/0206753 A1 | 9/2005 | Sakurai et al. | |

(56) References Cited

U.S. PATENT DOCUMENTS

| | | |
|---|---|---|
| 2005/0212925 A1 | 9/2005 | Lefebure et al. |
| 2005/0216426 A1 | 9/2005 | Weston et al. |
| 2005/0226505 A1 | 10/2005 | Wilson |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2005/0273453 A1 | 12/2005 | Holloran |
| 2006/0013463 A1 | 1/2006 | Ramsay et al. |
| 2006/0017810 A1 | 1/2006 | Kurzweil et al. |
| 2006/0023271 A1 | 2/2006 | Boay et al. |
| 2006/0031344 A1 | 2/2006 | Mishima et al. |
| 2006/0047704 A1 | 3/2006 | Gopalakrishnan |
| 2006/0048046 A1 | 3/2006 | Joshi et al. |
| 2006/0074821 A1 | 4/2006 | Cristianini |
| 2006/0082595 A1 | 4/2006 | Liu et al. |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0095830 A1 | 5/2006 | Krishna et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0126918 A1 | 6/2006 | Oohashi et al. |
| 2006/0147113 A1 | 7/2006 | Han |
| 2006/0159364 A1 | 7/2006 | Poon et al. |
| 2006/0161646 A1 | 7/2006 | Chene et al. |
| 2006/0164682 A1 | 7/2006 | Lev |
| 2006/0195491 A1 | 8/2006 | Nieland et al. |
| 2006/0203107 A1 | 9/2006 | Steinberg et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0239539 A1 | 10/2006 | Kochi et al. |
| 2006/0242180 A1 | 10/2006 | Graf et al. |
| 2006/0256371 A1 | 11/2006 | King et al. |
| 2006/0256392 A1 | 11/2006 | Van Hoof et al. |
| 2006/0257048 A1 | 11/2006 | Lin et al. |
| 2006/0262962 A1 | 11/2006 | Hull et al. |
| 2006/0263134 A1 | 11/2006 | Beppu |
| 2006/0265640 A1 | 11/2006 | Albornoz et al. |
| 2006/0268352 A1 | 11/2006 | Tanigawa et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2006/0294154 A1 | 12/2006 | Shimizu |
| 2007/0002348 A1 | 1/2007 | Hagiwara |
| 2007/0002375 A1 | 1/2007 | Ng |
| 2007/0003155 A1 | 1/2007 | Miller et al. |
| 2007/0005341 A1 | 1/2007 | Burges et al. |
| 2007/0011334 A1 | 1/2007 | Higgins et al. |
| 2007/0016848 A1 | 1/2007 | Rosenoff et al. |
| 2007/0030540 A1 | 2/2007 | Cheng et al. |
| 2007/0031028 A1 | 2/2007 | Vetter et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0172151 A1 | 7/2007 | Gennetten et al. |
| 2007/0177818 A1 | 8/2007 | Teshima et al. |
| 2007/0204162 A1 | 8/2007 | Rodriguez |
| 2007/0206877 A1 | 9/2007 | Wu et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0255653 A1 | 11/2007 | Tumminaro et al. |
| 2007/0260588 A1 | 11/2007 | Biazetti et al. |
| 2008/0004073 A1 | 1/2008 | John et al. |
| 2008/0005678 A1 | 1/2008 | Buttner et al. |
| 2008/0068452 A1 | 3/2008 | Nakao et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0095467 A1 | 4/2008 | Olszak et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0147790 A1 | 6/2008 | Malaney et al. |
| 2008/0166025 A1 | 7/2008 | Thorne |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0199081 A1 | 8/2008 | Kimura et al. |
| 2008/0211809 A1 | 9/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0292144 A1 | 11/2008 | Kim |
| 2008/0294737 A1 | 11/2008 | Kim |
| 2008/0298718 A1 | 12/2008 | Liu et al. |
| 2009/0015687 A1 | 1/2009 | Shinkai et al. |
| 2009/0073266 A1 | 3/2009 | Abdellaziz Trimeche et al. |
| 2009/0089078 A1 | 4/2009 | Bursey |
| 2009/0103808 A1 | 4/2009 | Dey et al. |
| 2009/0110267 A1 | 4/2009 | Zakhor et al. |
| 2009/0132468 A1 | 5/2009 | Putivsky et al. |
| 2009/0132504 A1 | 5/2009 | Vegnaduzzo et al. |
| 2009/0141985 A1 | 6/2009 | Sheinin et al. |
| 2009/0154778 A1 | 6/2009 | Lei et al. |
| 2009/0159509 A1 | 6/2009 | Wojdyla et al. |
| 2009/0164889 A1 | 6/2009 | Piersol et al. |
| 2009/0175537 A1 | 7/2009 | Tribelhorn et al. |
| 2009/0185241 A1 | 7/2009 | Nepomniachtchi |
| 2009/0214112 A1 | 8/2009 | Borrey et al. |
| 2009/0225180 A1 | 9/2009 | Maruyama et al. |
| 2009/0228499 A1 | 9/2009 | Schmidtler et al. |
| 2009/0254487 A1 | 10/2009 | Dhar et al. |
| 2009/0285445 A1 | 11/2009 | Vasa |
| 2009/0324025 A1 | 12/2009 | Camp, Jr. et al. |
| 2009/0324062 A1 | 12/2009 | Lim et al. |
| 2009/0327250 A1 | 12/2009 | Green et al. |
| 2010/0007751 A1 | 1/2010 | Icho et al. |
| 2010/0014769 A1 | 1/2010 | Lundgren |
| 2010/0049035 A1 | 2/2010 | Hu et al. |
| 2010/0060910 A1 | 3/2010 | Fechter |
| 2010/0060915 A1 | 3/2010 | Suzuki et al. |
| 2010/0062491 A1 | 3/2010 | Lehmbeck |
| 2010/0082491 A1 | 4/2010 | Rosenblatt et al. |
| 2010/0142820 A1 | 6/2010 | Malik et al. |
| 2010/0150424 A1 | 6/2010 | Nepomniachtchi et al. |
| 2010/0166318 A1 | 7/2010 | Ben-Horesh et al. |
| 2010/0169250 A1 | 7/2010 | Schmidtler et al. |
| 2010/0174974 A1 | 7/2010 | Brisebois et al. |
| 2010/0202698 A1 | 8/2010 | Schmidtler et al. |
| 2010/0202701 A1 | 8/2010 | Basri et al. |
| 2010/0209006 A1 | 8/2010 | Grigsby et al. |
| 2010/0214291 A1 | 8/2010 | Muller et al. |
| 2010/0214584 A1 | 8/2010 | Takahashi |
| 2010/0232706 A1 | 9/2010 | Forutanpour |

(56) References Cited

U.S. PATENT DOCUMENTS

| | | |
|---|---|---|
| 2010/0280859 A1 | 11/2010 | Frederick, II |
| 2010/0331043 A1 | 12/2010 | Chapman et al. |
| 2011/0004547 A1 | 1/2011 | Giordano et al. |
| 2011/0013039 A1 | 1/2011 | Aisaka et al. |
| 2011/0025825 A1 | 2/2011 | McNamer et al. |
| 2011/0025842 A1 | 2/2011 | King et al. |
| 2011/0025860 A1 | 2/2011 | Katougi et al. |
| 2011/0032570 A1 | 2/2011 | Imaizumi et al. |
| 2011/0035284 A1 | 2/2011 | Moshfeghi |
| 2011/0055033 A1 | 3/2011 | Chen et al. |
| 2011/0090337 A1 | 4/2011 | Klomp et al. |
| 2011/0091092 A1 | 4/2011 | Nepomniachtchi et al. |
| 2011/0116716 A1 | 5/2011 | Kwon et al. |
| 2011/0145178 A1 | 6/2011 | Schmidtler et al. |
| 2011/0181589 A1 | 7/2011 | Quan et al. |
| 2011/0182500 A1 | 7/2011 | Esposito et al. |
| 2011/0194127 A1 | 8/2011 | Nagakoshi et al. |
| 2011/0196870 A1 | 8/2011 | Schmidtler et al. |
| 2011/0200107 A1 | 8/2011 | Ryu |
| 2011/0246076 A1 | 10/2011 | Su et al. |
| 2011/0249905 A1 | 10/2011 | Singh et al. |
| 2011/0279456 A1 | 11/2011 | Hiranuma et al. |
| 2011/0280450 A1 | 11/2011 | Nepomniachtchi et al. |
| 2011/0285873 A1 | 11/2011 | Showering |
| 2011/0285874 A1 | 11/2011 | Showering et al. |
| 2011/0313966 A1 | 12/2011 | Schmidt et al. |
| 2012/0008856 A1 | 1/2012 | Hewes et al. |
| 2012/0019614 A1 | 1/2012 | Murray et al. |
| 2012/0038549 A1 | 2/2012 | Mandella et al. |
| 2012/0057756 A1 | 3/2012 | Yoon et al. |
| 2012/0069131 A1 | 3/2012 | Abelow |
| 2012/0075442 A1 | 3/2012 | Vujic |
| 2012/0077476 A1 | 3/2012 | Paraskevakos et al. |
| 2012/0092329 A1 | 4/2012 | Koo et al. |
| 2012/0105662 A1 | 5/2012 | Staudacher et al. |
| 2012/0113489 A1 | 5/2012 | Heit et al. |
| 2012/0114249 A1 | 5/2012 | Conwell |
| 2012/0116957 A1 | 5/2012 | Zanzot et al. |
| 2012/0131139 A1 | 5/2012 | Siripurapu et al. |
| 2012/0134576 A1* | 5/2012 | Sharma ............... G06K 9/4604 382/155 |
| 2012/0162527 A1 | 6/2012 | Baker |
| 2012/0194692 A1 | 8/2012 | Mers et al. |
| 2012/0195466 A1 | 8/2012 | Teng et al. |
| 2012/0215578 A1 | 8/2012 | Swierz, III et al. |
| 2012/0230577 A1 | 9/2012 | Calman et al. |
| 2012/0230606 A1 | 9/2012 | Sugiyama et al. |
| 2012/0236019 A1 | 9/2012 | Oh et al. |
| 2012/0269398 A1 | 10/2012 | Fan et al. |
| 2012/0272192 A1 | 10/2012 | Grossman et al. |
| 2012/0284122 A1 | 11/2012 | Brandis |
| 2012/0284185 A1 | 11/2012 | Mettler et al. |
| 2012/0290421 A1 | 11/2012 | Qawami et al. |
| 2012/0293607 A1 | 11/2012 | Bhogal et al. |
| 2012/0300020 A1 | 11/2012 | Arth et al. |
| 2012/0301011 A1 | 11/2012 | Grzechnik |
| 2012/0301024 A1 | 11/2012 | Yuan et al. |
| 2012/0308139 A1 | 12/2012 | Dhir |
| 2013/0004076 A1* | 1/2013 | Koo ..................... G06K 9/228 382/176 |
| 2013/0022231 A1 | 1/2013 | Nepomniachtchi et al. |
| 2013/0027757 A1 | 1/2013 | Lee et al. |
| 2013/0057703 A1 | 3/2013 | Vu et al. |
| 2013/0060596 A1 | 3/2013 | Gu et al. |
| 2013/0066798 A1 | 3/2013 | Morin et al. |
| 2013/0073459 A1 | 3/2013 | Zacarias et al. |
| 2013/0078983 A1 | 3/2013 | Doshi et al. |
| 2013/0080347 A1 | 3/2013 | Paul et al. |
| 2013/0088757 A1 | 4/2013 | Schmidtler et al. |
| 2013/0090969 A1 | 4/2013 | Rivere |
| 2013/0097157 A1 | 4/2013 | Ng et al. |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0142402 A1* | 6/2013 | Myers ............... G06K 9/00288 382/118 |
| 2013/0152176 A1 | 6/2013 | Courtney et al. |
| 2013/0182002 A1 | 7/2013 | Macciola et al. |
| 2013/0182105 A1 | 7/2013 | Fahn et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0188865 A1 | 7/2013 | Saha et al. |
| 2013/0198358 A1 | 8/2013 | Taylor |
| 2013/0223762 A1 | 8/2013 | Nagamasa |
| 2013/0230246 A1 | 9/2013 | Nuggehalli |
| 2013/0251280 A1 | 9/2013 | Borrey et al. |
| 2013/0268378 A1 | 10/2013 | Yovin |
| 2013/0268430 A1 | 10/2013 | Lopez et al. |
| 2013/0271579 A1 | 10/2013 | Wang |
| 2013/0287265 A1 | 10/2013 | Nepomniachtchi et al. |
| 2013/0287284 A1 | 10/2013 | Nepomniachtchi et al. |
| 2013/0290036 A1 | 10/2013 | Strange |
| 2013/0297353 A1 | 11/2013 | Strange et al. |
| 2013/0308832 A1 | 11/2013 | Schmidtler et al. |
| 2013/0329023 A1 | 12/2013 | Suplee, III et al. |
| 2014/0003721 A1 | 1/2014 | Saund |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0032406 A1 | 1/2014 | Roach et al. |
| 2014/0055812 A1 | 2/2014 | DeRoller |
| 2014/0055826 A1 | 2/2014 | Hinski |
| 2014/0079294 A1 | 3/2014 | Amtrup et al. |
| 2014/0108456 A1 | 4/2014 | Ramachandrula et al. |
| 2014/0149308 A1 | 5/2014 | Ming |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0172687 A1 | 6/2014 | Chirehdast |
| 2014/0181691 A1 | 6/2014 | Poornachandran et al. |
| 2014/0201612 A1 | 7/2014 | Buttner et al. |
| 2014/0207717 A1 | 7/2014 | Schmidtler et al. |
| 2014/0211991 A1 | 7/2014 | Stoppa et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270439 A1 | 9/2014 | Chen |
| 2014/0270536 A1 | 9/2014 | Amtrup et al. |
| 2014/0316841 A1 | 10/2014 | Kilby et al. |
| 2014/0317595 A1 | 10/2014 | Kilby et al. |
| 2014/0327940 A1 | 11/2014 | Amtrup et al. |
| 2014/0328520 A1 | 11/2014 | Macciola et al. |
| 2014/0333971 A1 | 11/2014 | Macciola et al. |
| 2014/0368890 A1 | 12/2014 | Amtrup et al. |
| 2014/0376060 A1 | 12/2014 | Bocharov et al. |
| 2015/0040001 A1 | 2/2015 | Kannan et al. |
| 2015/0040002 A1 | 2/2015 | Kannan et al. |
| 2015/0093033 A1 | 4/2015 | Kwon et al. |
| 2015/0098628 A1 | 4/2015 | Macciola et al. |
| 2015/0120564 A1 | 4/2015 | Smith et al. |
| 2015/0161765 A1 | 6/2015 | Kota et al. |
| 2015/0170085 A1 | 6/2015 | Amtrup et al. |
| 2015/0248391 A1 | 9/2015 | Watanabe |
| 2015/0324640 A1 | 11/2015 | Macciola et al. |
| 2015/0339526 A1 | 11/2015 | Macciola et al. |
| 2015/0347861 A1 | 12/2015 | Doepke et al. |
| 2015/0355889 A1 | 12/2015 | Kilby et al. |
| 2016/0019530 A1 | 1/2016 | Wang et al. |
| 2016/0028921 A1 | 1/2016 | Thrasher et al. |
| 2016/0034775 A1 | 2/2016 | Meadow et al. |
| 2016/0055395 A1 | 2/2016 | Macciola et al. |
| 2016/0112645 A1 | 4/2016 | Amtrup et al. |
| 2016/0125613 A1 | 5/2016 | Shustorovich et al. |
| 2016/0171603 A1 | 6/2016 | Amtrup et al. |
| 2016/0217319 A1 | 7/2016 | Bhanu et al. |
| 2016/0350592 A1 | 12/2016 | Ma et al. |
| 2017/0024629 A1 | 1/2017 | Thrasher et al. |
| 2017/0046788 A1 | 2/2017 | Macciola et al. |

(56) References Cited

U.S. PATENT DOCUMENTS

| | | |
|---|---|---|
| 2017/0103281 A1 | 4/2017 | Amtrup et al. |
| 2017/0104885 A1 | 4/2017 | Amtrup et al. |
| 2017/0109576 A1 | 4/2017 | Shustorovich et al. |
| 2017/0109588 A1 | 4/2017 | Ma et al. |
| 2017/0109606 A1 | 4/2017 | Macciola et al. |
| 2017/0109610 A1 | 4/2017 | Macciola et al. |
| 2017/0109818 A1 | 4/2017 | Amtrup et al. |
| 2017/0109819 A1 | 4/2017 | Amtrup et al. |
| 2017/0109830 A1 | 4/2017 | Macciola et al. |
| 2017/0111532 A1 | 4/2017 | Amtrup et al. |
| 2017/0147572 A1 | 5/2017 | Kilby et al. |
| 2017/0286764 A1 | 10/2017 | Ma et al. |
| 2017/0351915 A1 | 12/2017 | Thompson et al. |
| 2017/0357869 A1 | 12/2017 | Shustorovich et al. |

FOREIGN PATENT DOCUMENTS

| | | |
|---|---|---|
| CN | 101673402 A | 3/2010 |
| CN | 101894262 A | 11/2010 |
| EP | 0549329 A2 | 6/1993 |
| EP | 0723247 A1 | 7/1996 |
| EP | 0767578 A2 | 4/1997 |
| EP | 0809219 A2 | 11/1997 |
| EP | 0843277 A2 | 5/1998 |
| EP | 0936804 A2 | 8/1999 |
| EP | 1054331 A2 | 11/2000 |
| EP | 1128659 A1 | 8/2001 |
| EP | 1229485 A2 | 8/2002 |
| EP | 1317133 A1 | 6/2003 |
| EP | 1319133 A1 | 6/2003 |
| EP | 1422520 A1 | 5/2004 |
| EP | 1422920 A2 | 5/2004 |
| EP | 1956518 A1 | 8/2008 |
| EP | 1959363 A2 | 8/2008 |
| EP | 1976259 A1 | 10/2008 |
| EP | 2107480 A1 | 10/2009 |
| EP | 2472372 A1 | 7/2012 |
| JP | H04034671 A | 2/1992 |
| JP | H05060616 A | 3/1993 |
| JP | H07260701 A | 10/1995 |
| JP | H0962826 A | 3/1997 |
| JP | H09116720 A | 5/1997 |
| JP | H11118444 A | 4/1999 |
| JP | 2000067065 A | 3/2000 |
| JP | 2000103628 A | 4/2000 |
| JP | 2000354144 A | 12/2000 |
| JP | 2001297303 A | 10/2001 |
| JP | 2001309128 A | 11/2001 |
| JP | 2002024258 A | 1/2002 |
| JP | 2002109242 A | 4/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2004363786 A | 12/2004 |
| JP | 2005018678 A | 1/2005 |
| JP | 2005071262 A | 3/2005 |
| JP | 2005085173 A | 3/2005 |
| JP | 2005173730 A | 6/2005 |
| JP | 2005208861 A | 8/2005 |
| JP | 2006031379 A | 2/2006 |
| JP | 2006054519 A | 2/2006 |
| JP | 2006126941 A | 5/2006 |
| JP | 2006209588 A | 8/2006 |
| JP | 2006330863 A | 12/2006 |
| JP | 200752670 A | 3/2007 |
| JP | 2007251518 A | 9/2007 |
| JP | 2008134683 A | 6/2008 |
| JP | 2009541896 A | 11/2009 |
| JP | 2010062722 A | 3/2010 |
| JP | 2011034387 A | 2/2011 |
| JP | 2011055467 A | 3/2011 |
| JP | 2012008791 A | 1/2012 |
| JP | 2012009033 A | 1/2012 |
| JP | 2012058904 A | 3/2012 |
| JP | 2012156644 A | 8/2012 |
| JP | 2012517637 A | 8/2012 |
| JP | 2012217159 A | 11/2012 |
| JP | 2013196357 A | 9/2013 |
| JP | 5462286 B2 | 4/2014 |
| TW | 401553 B | 8/2000 |
| WO | 9604749 A1 | 2/1996 |
| WO | 9847098 A1 | 10/1998 |
| WO | 9967731 A1 | 12/1999 |
| WO | 0263812 A2 | 8/2002 |
| WO | 02063812 A2 | 8/2002 |
| WO | 2004053630 A2 | 6/2004 |
| WO | 2004056360 A1 | 7/2004 |
| WO | 2006104627 A1 | 10/2006 |
| WO | 2007081147 A1 | 7/2007 |
| WO | 2007082534 A1 | 7/2007 |
| WO | 2008008142 A2 | 1/2008 |
| WO | 2010030056 A1 | 3/2010 |
| WO | 2010056368 A1 | 5/2010 |
| WO | 2010096192 A1 | 8/2010 |
| WO | 2013059599 A1 | 4/2013 |

OTHER PUBLICATIONS

Extended European Search Report from European Application No. 14775259.6, dated Jun. 1, 2016.

Clemons, J. et al., "MEVBench: A Mobile Computer Vision Benchmarking Suite," IEEE, 2011, pp. 91-102.

Gonzalez, R. C. et al., "Image Interpolation", Digital Image Processing, Third Edition,2008, Chapter 2, pp. 65-68.

Kim, D. et al., "Location-based large-scale landmark image recognition scheme for mobile devices," 2012 Third FTRA International Conference on Mobile, Ubiquitous, and Intelligent Computing, IEEE, 2012, pp. 47-52.

Sauvola, J. et al., "Adaptive document image binarization," Pattern Recognition, vol. 33, 2000, pp. 225-236.

Tsai, C., "Effects of 2-D Preprocessing on Feature Extraction: Accentuating Features by Decimation, Contrast Enhancement, Filtering," EE 262: 2D Imaging Project Report, 2008, pp. 1-9.

Amtrup, J. W. et al., U.S. Appl. No. 14/220,029, filed Mar. 19, 2014.

International Search Report and Written Opinion from PCT Application No. PCT/US15/26022, dated Jul. 22, 2015.

Non-Final Office Action from U.S. Appl. No. 14/588,147, dated Jun. 3, 2015.

Notice of Allowance from Japanese Patent Application No. 2014-005616, dated Jun. 12, 2015.

Office Action from Japanese Patent Application No. 2014-005616, dated Oct. 7, 2014.

Final Office Action from U.S. Appl. No. 14/588,147, dated Nov. 4, 2015.

Non-Final Office Action from U.S. Appl. No. 14/283,156, dated Dec. 1, 2015.

Notice of Allowance from U.S. Appl. No. 14/588,147, dated Jan. 14, 2016.

Non-Final Office Action from U.S. Appl. No. 14/804,278, dated Mar. 10, 2016.

Notice of Allowance from U.S. Appl. No. 14/283,156, dated Mar. 16, 2016.

Summons to Attend Oral Proceedings from European Application No. 10741580.4, dated Jun. 7, 2016.

Notice of Allowance from U.S. Appl. No. 14/078,402, dated Feb. 26, 2014.

Non-Final Office Action from U.S. Appl. No. 14/078,402, dated Jan. 30, 2014.

Notice of Allowance from U.S. Appl. No. 14/175,999, dated Aug. 8, 2014.

Non-Final Office Action from U.S. Appl. No. 14/175,999, dated Apr. 3, 2014.

Notice of Allowance from U.S. Appl. No. 13/802,226, dated Jan. 29, 2016.

Non-Final Office Action from U.S. Appl. No. 13/802,226, dated Sep. 30, 2015.

(56) References Cited

OTHER PUBLICATIONS

Final Office Action from U.S. Appl. No. 13/802,226, dated May 20, 2015.
Non-Final Office Action from U.S. Appl. No. 13/802,226, dated Jan. 8, 2015.
Non-Final Office Action from U.S. Appl. No. 14/209,825, dated Apr. 14, 2015.
Final Office Action from U.S. Appl. No. 14/209,825, dated Aug. 13, 2015.
Notice of Allowance from U.S. Appl. No. 14/209,825, dated Oct. 28, 2015.
International Search Report and Written Opinion from International Application No. PCT/US2014/026569, dated Aug. 12, 2014.
Gllavata, et al., "Finding Text in Images via Local Thresholding," International Symposium on Signal Processing and Information Technology, Dec. 2003, pp. 539-542.
Zunino, et al., "Vector Quantization for License-Plate Location and Image Coding," IEEE Transactions on Industrial Electronics, vol. 47, Issue 1, Feb. 2000, pp. 159-167.
Bruns, E. et al., "Mobile Phone-Enabled Museum Guidance with Adaptive Classification," Computer Graphics and Applications, IEEE, vol. 28, No. 4, Jul.-Aug. 2008, pp. 98,102.
Tzotsos, A. et al., "Support vector machine classification for object-based image analysis," Object-Based Image Analysis, Springer Berlin Heidelberg, 2008, pp. 663-677.
Vailaya, A. et al., "On Image Classification: City Images vs. Landscapes," Pattern Recognition, vol. 31, No. 12, Dec. 1998, pp. 1921-1935.
International Search Report and Written Opinion from International Application No. PCT/US2016/043207, dated Oct. 21, 2016.
Non-Final Office Action from U.S. Appl. No. 14/927,359, dated Nov. 21, 2016.
Final Office Action from U.S. Appl. No. 14/814,455, dated Dec. 16, 2016.
Non-Final Office Action from U.S. Appl. No. 14/814,455, dated Jun. 17, 2016.
Non-Final Office Action from U.S. Appl. No. 14/818,196, dated Aug. 19, 2016.
International Search Report and Written Opinion from International Application No. PCT/US14/26569, dated Aug. 12, 2014.
Non-Final Office Action from U.S. Appl. No. 13/898,407, dated Aug. 1, 2013.
Final Office Action from U.S. Appl. No. 13/898,407, dated Jan. 13, 2014.
Notice of Allowance from U.S. Appl. No. 13/898,407, dated Apr. 23, 2014.
Non-Final Office Action from U.S. Appl. No. 14/340,460, dated Jan. 16, 2015.
Notice of Allowance from U.S. Appl. No. 14/340,460, dated Apr. 28, 2015.
Office Action from Japanese Patent Application No. 2014-552356, dated Jun. 2, 2015.
Office Action from Taiwan Application No. 102101177, dated Dec. 17, 2014.
Notice of Allowance from U.S. Appl. No. 14/220,023, dated Jan. 30, 2015.
Notice of Allowance from U.S. Appl. No. 14/220,029, dated Feb. 11, 2015.
International Search Report and Written Opinion from International Application No. PCT/US2013/021336, dated May 23, 2013.
Non-Final Office Action from U.S. Appl. No. 13/740,127, dated Oct. 27, 2014.
Notice of Allowance from U.S. Appl. No. 13/740,131, dated Oct. 27, 2014.
Final Office Action from U.S. Appl. No. 13/740,134, dated Mar. 3, 2015.
Non-Final Office Action from U.S. Appl. No. 13/740,134, dated Oct. 10, 2014.
Non-Final Office Action from U.S. Appl. No. 13/740,138, dated Dec. 1, 2014.
Notice of Allowance from U.S. Appl. No. 13/740,139, dated Aug. 29, 2014.
Notice of Allowance from U.S. Appl. No. 13/740,145, dated Mar. 30, 2015.
Non-Final Office Action from U.S. Appl. No. 13/740,145, dated Sep. 29, 2014.
Notice of Allowance from Taiwan Patent Application No. 102101177, dated Apr. 24, 2015.
Notice of Allowance from U.S. Appl. No. 13/740,138, dated Jun. 5, 2015.
Notice of Allowance from U.S. Appl. No. 13/740,127, dated Jun. 8, 2015.
Notice of Allowance from U.S. Appl. No. 14/569,375, dated Apr. 15, 2015.
Notice of Allowance from U.S. Appl. No. 13/740,134, dated May 29, 2015.
Notice of Allowability from U.S. Appl. No. 13/740,145, dated May 26, 2015.
Corrected Notice of Allowability from U.S. Appl. No. 13/740,138, dated Jul. 8, 2018.
Non-Final Office Action from U.S. Appl. No. 13/740,127, dated Feb. 23, 2015.
Final Office Action from U.S. Appl. No. 13/740,134, dated Mar. 3, 3015.
Notice of Allowance from U.S. Appl. No. 14/804,276, dated Oct. 21, 2015.
Extended Europrean Search Report from European Application No. 13738301.4, dated Nov. 17, 2015.
Notice of Allowance from U.S. Appl. No. 13/740,145, dated Jan. 15, 2016.
Office Action from Taiwan Patent Application No. 102101177, dated Dec. 17, 2014.
Non-Final Office Action from U.S. Appl. No. 13/740,141, dated Oct. 16, 2015.
Notice of Allowance from U.S. Appl. No. 13/740,145, dated Sep. 8, 2015.
Notice of Allowance from U.S. Appl. No. 14/334,558, dated Sep. 10, 2014.
Notice of Allowance from U.S. Appl. No. 13/740,123, dated Jul. 10, 2014.
INTSIG Information Co., Ltd., "CamScanner," www.intsig.com/en/camscanner.html, retrieved Oct. 25, 2012.
INTSIG Information Co., Ltd., "Product Descriptions," www.intsig.com/en/product.html, retrieved Oct. 25, 2012.
Final Office Action from U.S. Appl. No. 13/740,141, dated May 5, 2016.
Thrasher, C. W. et al., U.S. Appl. No. 15/214,351, filed Jul. 19, 2016.
Notice of Allowance from U.S. Appl. No. 13/740,141, dated Jul. 29, 2016.
Gllavata et al., "Finding Text in Images via Local Thresholding," International Symposium on Signal Processing and Information Technology, Dec. 2003, pp. 539-542.
Zunino et al., "Vector Quantization for License-Plate Location and Image Coding," IEEE Transactions on Industrial Electronics, vol. 47, Issue 1, Feb. 2000, pp. 159-167.
International Search Report and Written Opinion from International Application No. PCT/US2014/057065, dated Dec. 30, 2014.
Non-Final Office Action from U.S. Appl. No. 14/932,902, dated Sep. 28, 2016.
Su et al., "Stereo rectification of calibrated image pairs based on geometric transformation," I.J.Modern Education and Computer Science, vol. 4, 2011, pp. 17-24.
Malis et al., "Deeper understanding of the homography decomposition for vision-based control," [Research Report] RR-6303, INRIA, Sep. 2007, pp. 1-90.
Notice of Allowance from U.S. Appl. No. 14/491,901, dated Aug. 4, 2015.
Final Office Action from U.S. Appl. No. 14/491,901, dated Apr. 30, 2015.
Non-Final Office Action from U.S. Appl. No. 14/491,901, dated Nov. 19, 2014.

(56) References Cited

OTHER PUBLICATIONS

Non-Final Office Action from U.S. Appl. No. 15/234,969, dated Nov. 18, 2016.
Final Office Action from U.S. Appl. No. 14/804,278, dated Jun. 28, 2016.
International Search Report and Written Opinion from International Application No. PCT/US2014/065831, dated Feb. 26, 2015.
U.S. Appl. No. 61/780,747, filed Mar. 13, 2013.
U.S. Appl. No. 61/819,463, filed May 3, 2013.
Notice of Allowance from U.S. Appl. No. 14/268,876, dated Aug. 29, 2014.
Non-Final Office Action from U.S. Appl. No. 14/268,876, dated Jul. 24, 2014.
Non-Final Office Action from U.S. Appl. No. 14/473,950, dated Jan. 21, 2015.
Non-Final Office Action from U.S. Appl. No. 14/473,950, dated Feb. 6, 2015.
Final Office Action from U.S. Appl. No. 14/473,950, dated Jun. 26, 2015.
Notice of Allowance from U.S. Appl. No. 14/473,950, dated Sep. 16, 2015.
Non-Final Office Action from U.S. Appl. No. 14/981,759, dated Jun. 7, 2016.
Extended European Search Report from European Application No. 14861942.2, dated Nov. 2, 2016.
Non-Final Office Action from U.S. Appl. No. 15/191,442, dated Oct. 12, 2016.
Partial Supplementary European Search Report from European Application No. 14792188.6, dated Sep. 12, 2016.
Notice of Allowance from U.S. Appl. No. 14/981,759, dated Nov. 16, 2016.
International Search Report and Written Opinion from International Application No. PCT/US2015/021597, dated Jun. 22, 2015.
U.S. Appl. No. 14/340,460, filed Jul. 24, 2014.
Requirement for Restriction from U.S. Appl. No. 14/177,136, dated Aug. 15, 2014.
International Search Report and Written Opinion from PCT Application No. PCT/US2014/036673, dated Aug. 28, 2014.
U.S. Appl. No. 14/473,950, filed Aug. 29, 2014.
Final Office Action from U.S. Appl. No. 14/176,006, dated Sep. 3, 2014.
Bishop, C.M., "Neural Networks for Pattern Recognition," Oxford University Press, Inc., 1995, p. 27.
Bishop, C.M., "Neural Networks for Pattern Recognition," Oxford University Press, Inc., 1995, pp. 77-85.
Bishop, C.M., "Neural Networks for Pattern Recognition," Oxford University Press, Inc., 1995, pp. 230-247.
Bishop, C.M., "Neural Networks for Pattern Recognition," Oxford University Press, Inc., 1995, pp. 295-300.
Bishop, C.M., "Neural Networks for Pattern Recognition," Oxford University Press, Inc., 1995, pp. 343-345.
Final Office Action from U.S. Appl. No. 14/220,023, dated Sep. 18, 2014.
International Search Report and Written Opinion from PCT Application No. PCT/US14/26597, dated Sep. 19, 2014.
U.S. Appl. No. 14/491,901, filed Sep. 19, 2014.
Final Office Action from U.S. Appl. No. 14/220,029, dated Sep. 26, 2014.
International Search Report and Written Opinion from PCT Application No. PCT/US14/36851, dated Sep. 25, 2014.
Notice of Allowance from U.S. Appl. No. 14/176,006, dated Oct. 1, 2014.
Non-Final Office Action from U.S. Appl. No. 11/752,691, dated Oct. 10, 2014.
Non-Final Office Action from U.S. Appl. No. 15/146,848, dated Dec. 6, 2016.
U.S. Appl. No. 15/389,342, filed Dec. 22, 2016.
U.S. Appl. No. 15/390,321, filed Dec. 23, 2016.
Final Office Action from U.S. Appl. No. 14/177,136, dated Nov. 4, 2016.
Non-Final Office Action from U.S. Appl. No. 14/177,136, dated Apr. 13, 2016.
Non-Final Office Action from U.S. Appl. No. 14/177,136, dated Dec. 29, 2014.
"Location and Camera with Cell Phones," Wikipedia, Mar. 30, 2016, pp. 1-19.
Non-Final Office Action from U.S. Appl. No. 14/176,006, dated Apr. 7, 2014.
Non-Final Office Action from U.S. Appl. No. 14/220,023, dated May 5, 2014.
Non-Final Office Action from U.S. Appl. No. 14/220,029, dated May 14, 2014.
International Search Report and Written Opinion from International Application No. PCT/US2016/043204, dated Oct. 6, 2016.
Final Office Action from U.S. Appl. No. 14/818,196, dated Jan. 9, 2017.
Decision to Refuse from European Application No. 10 741 580.4, dated Jan. 20, 2017.
Rainardi, V., "Building a Data Warehouse: With Examples in SQL Server," Apress, Dec. 27, 2007, pp. 471-473.
Office Action from Japanese Patent Application No. 2015-229466, dated Nov. 29, 2016.
Extended European Search Report from European Application No. 14792188.6, dated Jan. 25, 2017.
Non-Final Office Action from U.S. Appl. No. 15/394,719, dated Feb. 21, 2017.
Non-Final Office Action from U.S. Appl. No. 15/389,342, dated Mar. 10, 2017.
Notice of Allowance from U.S. Appl. No. 14/818,196, dated Mar. 16, 2017.
Office Action from Chinese Patent Application No. 201380004057.2, dated Feb. 27, 2017.
Notice of Allowance from U.S. Appl. No. 14/814,455, dated Mar. 30, 2017.
Non-Final Office Action from U.S. Appl. No. 14/932,902, dated Apr. 11, 2017.
Non-Final Office Action from U.S. Appl. No. 15/390,321, dated Mar. 17, 2017.
Notice of Allowance from U.S. Appl. No. 15/146,848, dated Apr. 13, 2017.
Notice of Allowance from U.S. Appl. No. 15/191,442, dated Apr. 24, 2017.
Final Office Action from U.S. Appl. No. 14/927,359, dated Apr. 28, 2017.
Notice of Allowance from U.S. Appl. No. 15/234,969, dated May 8, 2017.
Notice of Allowance from U.S. Appl. No. 14/814,455, dated May 26, 2017.
Corrected Notice of Allowance from U.S. Appl. No. 15/191,442, dated May 26, 2017.
Extended European Search Report from European Application No. 14881675.4, dated Jun. 7, 2017.
Notice of Allowance from U.S. Appl. No. 15/394,719, dated Jun. 20, 2017.
International Search Report and Written Opinion from International Application No. PCT/US2017/025553, dated May 24, 2017.
Office Action from Chinese Patent Application No. 201580014141.1, dated May 31, 2017.
Non-Final Office Action from U.S. Appl. No. 15/424,756, dated Jun. 27, 2017.
Corrected Notice of Allowance from U.S. Appl. No. 15/191,442, dated Jun. 29, 2017.
Notice of Allowance from U.S. Appl. No. 14/818,196, dated Jul. 3, 2017.
Extended European Search Report from European Application No. 14847922.3 dated Jun. 22, 2017.
Tsoi et al., "Geometric and Shading Correction for Images of Printed Materials A Unified Approach Using Boundary," Proceedings of the 2004 IEEE Computer Society Conference on Computer Vision and Pattern Recognition (CVPR'04), 2004, pp. 1-7.
Tian et al., "Rectification and 3D Reconstruction of Curved Document Images," 2011 IEEE Conference on Computer Vision and Pattern Recognition, Jun. 2011, pp. 377-384.

(56) References Cited

OTHER PUBLICATIONS

Notice of Allowance from U.S. Appl. No. 14/927,359, dated Jul. 20, 2017.
Corrected Notice of Allowance from U.S. Appl. No. 14/927,359, dated Aug. 2, 2017.
Corrected Notice of Allowance from U.S. Appl. No. 14/927,359, dated Aug. 9, 2017.
Corrected Notice of Allowance from U.S. Appl. No. 15/191,442, dated Aug. 2, 2017.
Notice of Allowance from U.S. Appl. No. 15/146,848, dated Aug. 4, 2017.
Notice of Allowance from U.S. Appl. No. 15/389,342, dated Aug. 14, 2017.
Notice of Grounds of Rejection from Japanese Application No. 2015-229466, dated Jul. 18, 2017, with English Translation.
Non-Final Office Action from U.S. Appl. No. 14/829,474, dated Aug. 17, 2017.
Office Action from Japanese Patent Application No. 2016-512078, dated Aug. 8, 2017.
Thompson et al., U.S. Appl. No. 15/686,017, filed Aug. 24, 2017.
Corrected Notice of Allowance from U.S. Appl. No. 15/389,342, dated Aug. 30, 2017.
Non-Final Office Action from U.S. Appl. No. 15/214,351, dated Sep. 5, 2017.
Shustorovich et al., U.S. Appl. No. 15/672,200, filed Aug. 8, 2017.
Notice of Allowance from U.S. Appl. No. 15/390,321, dated Oct. 4, 2017.
Final Office Action from U.S. Appl. No. 14/932,902, dated Oct. 20, 2017.
Non-Final Office Action from U.S. Appl. No. 15/686,017, dated Oct. 18, 2017.
Corrected Notice of Allowance from U.S. Appl. No. 15/390,321, dated Oct. 20, 2017.
Supplementary European Search Report from European Application No. 15764687.8, dated Oct. 17, 2017.
Examination Report from European Application No. 14775259.6, dated Oct. 25, 2017.
Office Action from Chinese Patent Application No. 201480014229.9, dated Oct. 10, 2017.
Examination Report from European Application No. 13738301.4, dated Oct. 26, 2017.
Non-Final Office Action from U.S. Appl. No. 15/234,993, dated Dec. 14, 2017.
Final Office Action from U.S. Appl. No. 15/424,756, dated Dec. 22, 2017.
Advisory Action from U.S. Appl. No. 14/932,902, dated Jan. 23, 2018.
Non-Final Office Action from U.S. Appl. No. 15/390,321, dated Jan. 23, 2018.
Non-Final Office Action from U.S. Appl. No. 14/829,474, dated Jan. 25, 2018.
Kofax Inc, "Module 2—Kofax Capture Overview," Jun. 2011, pp. 1-22.
Kofax Inc., "Kofax Capture 10.0 Developer's Guide," Aug. 1, 2011, 138 pages.
Final Office Action from U.S. Appl. No. 15/214,351, dated Jan. 25, 2018.
Notice of Allowance from U.S. Appl. No. 15/686,017, dated, Feb. 14, 2018.
Office Action from Japanese Patent Application No. 2016-512078, dated Feb. 13, 2018.
Notice of Allowance from U.S. Appl. No. 14/932,902, dated Feb. 16, 2018.
Corrected Notice of Allowance from U.S. Appl. No. 14/932,902, dated Mar. 2, 2018.
Office Action from Japanese Patent Application No. 2016-502192, dated Feb. 13, 2018.
Hirose et al., "Media Conversion for Document Images Based on Layout Analysis and Character Recognition," IEICE Technical Report, The Institute of Electronics, Information and Communication Engineers, vol. 99, No. 648, Feb. 21, 2000, pp. 39-46.
Oe et al., "Segmentation Method of Texture Image Using Two-Dimensional AR Model and Pyramid Linking," The Transactions of the Institute of Electronics, Information and Communication Engineers, vol. J75-D-II, No. 7, Jul. 25, 1992, pp. 1132-1142.
Statement of Relevance for non-translated Japanese non-patent literature: Hirose et al., "Media Conversion for Document Images Based on Layout Analysis and Character Recognition" and Oe et al., "Segmentation Method of Texture Image Using Two-Dimensional AR Model and Pyramid Linking", Mar. 19, 2018, 1 page.
Non-Final Office Action from U.S. Appl. No. 14/804,281, dated Mar. 16, 2018.

* cited by examiner

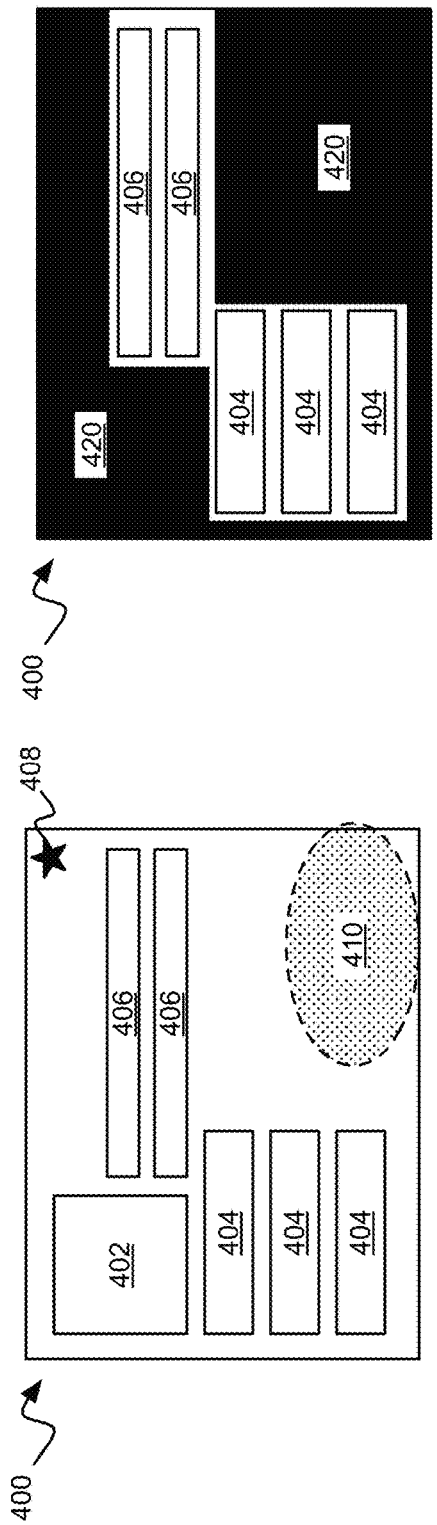
FIG. 4A
FIG. 4C
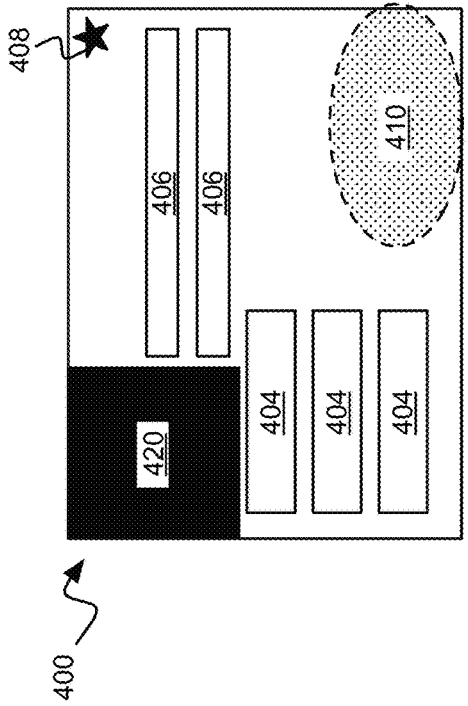
FIG. 4D
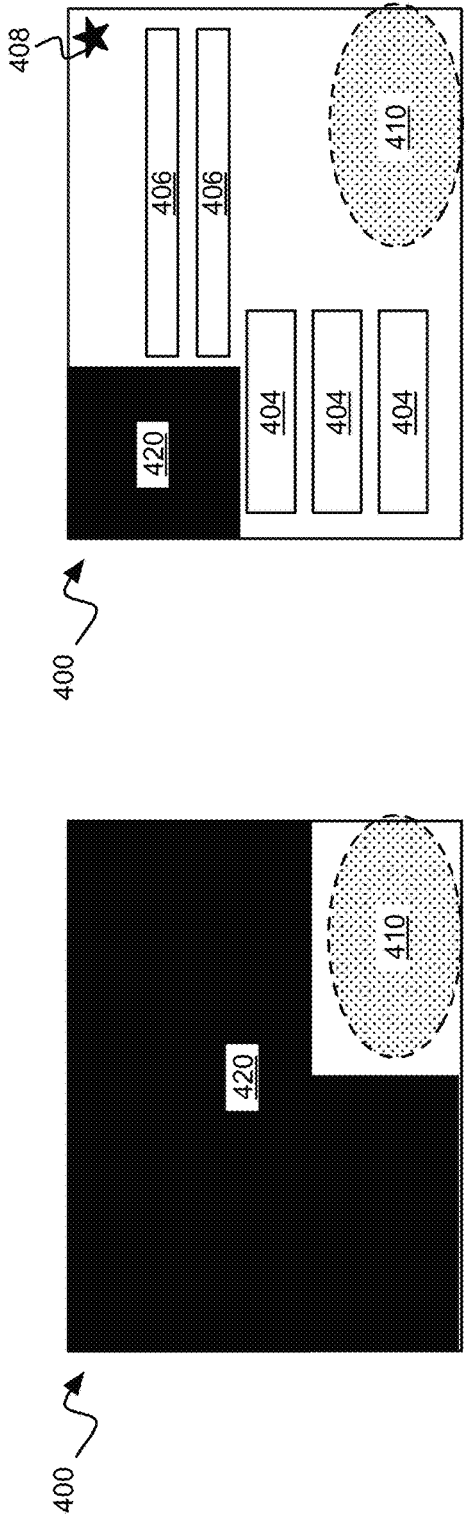
FIG. 4B

SYSTEMS AND METHODS FOR CLASSIFYING OBJECTS IN DIGITAL IMAGES CAPTURED USING MOBILE DEVICES

CROSS-REFERENCES TO RELATED APPLICATIONS

This application is related to U.S. patent application Ser. No. 13/740,123, filed Jan. 11, 2013; Ser. No. 12/042,774, filed Mar. 5, 2008; and Ser. No. 12/368,685, filed Feb. 10, 2009, each of which is herein incorporated by reference in its entirety. This application is also related to U.S. Pat. No. 7,761,391, granted Jul. 20, 2010 (U.S. patent application Ser. No. 11/752,364, filed May 13, 2007) and U.S. Pat. No. 6,370,277, granted Apr. 9, 2002 (U.S. patent application Ser. No. 09/206,753, filed Dec. 7, 1998), each of which is also herein incorporated by reference in its entirety.

FIELD OF INVENTION

The present invention relates to mobile image capture and image processing, and more particularly to capturing and processing digital images using a mobile device, and classifying objects detected in such digital images.

BACKGROUND OF THE INVENTION

Digital images having depicted therein an object inclusive of documents such as a letter, a check, a bill, an invoice, etc. have conventionally been captured and processed using a scanner or multifunction peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. As a result, conventional scanner-based processing algorithms typically perform poorly on digital images captured using a mobile device.

In addition, the limited processing and memory available on mobile devices makes conventional image processing algorithms employed for scanners prohibitively expensive in terms of computational cost. Attempting to process a conventional scanner-based image processing algorithm takes far too much time to be a practical application on modern mobile platforms.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a non-linear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

Conventional image processing algorithms designed to detect documents in images captured using traditional flat-bed and/or paper feed scanners may also utilize information derived from page detection to attempt to classify detected documents as members of a particular document class. However, due to the unique challenges introduced by virtue of capturing digital images using cameras of mobile devices, these conventional classification algorithms perform inadequately and are incapable of robustly classifying documents in such digital images.

Moreover, even when documents can be properly classified, the hardware limitations of current mobile devices make performing classification using the mobile device prohibitively expensive from a computational efficiency standpoint.

In view of the challenges presented above, it would be beneficial to provide an image capture and processing algorithm and applications thereof that compensate for and/or correct problems associated with image capture, processing and classification using a mobile device, while maintaining a low computational cost via efficient processing methods.

Moreover, it would be a further improvement in the field to provide object classification systems, methods and computer program products capable of robustly assigning objects to a particular class of objects and utilize information known about members of the class to further address and overcome unique challenges inherent to processing images captured using a camera of a mobile device.

SUMMARY OF THE INVENTION

In one embodiment, a computer-implemented method includes: receiving a digital image captured by a mobile device; and using a processor of the mobile device: generating a first representation of the digital image, the first representation being characterized by a reduced resolution; generating a first feature vector based on the first representation; comparing the first feature vector to a plurality of reference feature matrices; classifying an object depicted in the digital image as a member of a particular object class based at least in part on the comparing; and determining one or more object features of the object based at least in part on the particular object class.

In another embodiment, a computer program product includes a computer readable medium having stored thereon program instructions readable/executable by a processor of a mobile device to cause the processor to: generate a first representation of a digital image, the first representation being characterized by a reduced resolution; generate a first feature vector based on the first representation; compare the first feature vector to a plurality of reference feature matrices; classify an object depicted in the digital image as a member of a particular object class based at least in part on the comparing; and determine one or more object features of the object based at least in part on the particular object class.

In still another embodiment, a system includes: a mobile device having a processor integrated therewith; and logic. The logic is configured to cause the processor, upon execution thereof, to: generate a first representation of a digital image, the first representation being characterized by a reduced resolution; generate a first feature vector based on the first representation; compare the first feature vector to a plurality of reference feature matrices; classify an object depicted in the digital image as a member of a particular object class based at least in part on the comparing; and determine one or more object features of the object based at least in part on the particular object class.

Additional embodiments, features, etc. will become apparent to persons having ordinary skill in the art based on reading the following detailed description in view of the drawings.

BRIEF DESCRIPTION OF THE DRAWINGS

FIG. 4A is a schematic representation of a plurality of subregions depicted in a digital image of a document, according to one embodiment.

FIG. 4B is a masked representation of the digital image shown in FIG. 4A, according to one embodiment.

FIG. 4C is a masked representation of the digital image shown in FIG. 4A, according to one embodiment.

FIG. 4D is a masked representation of the digital image shown in FIG. 4A, according to one embodiment.

DETAILED DESCRIPTION

Figure 1:
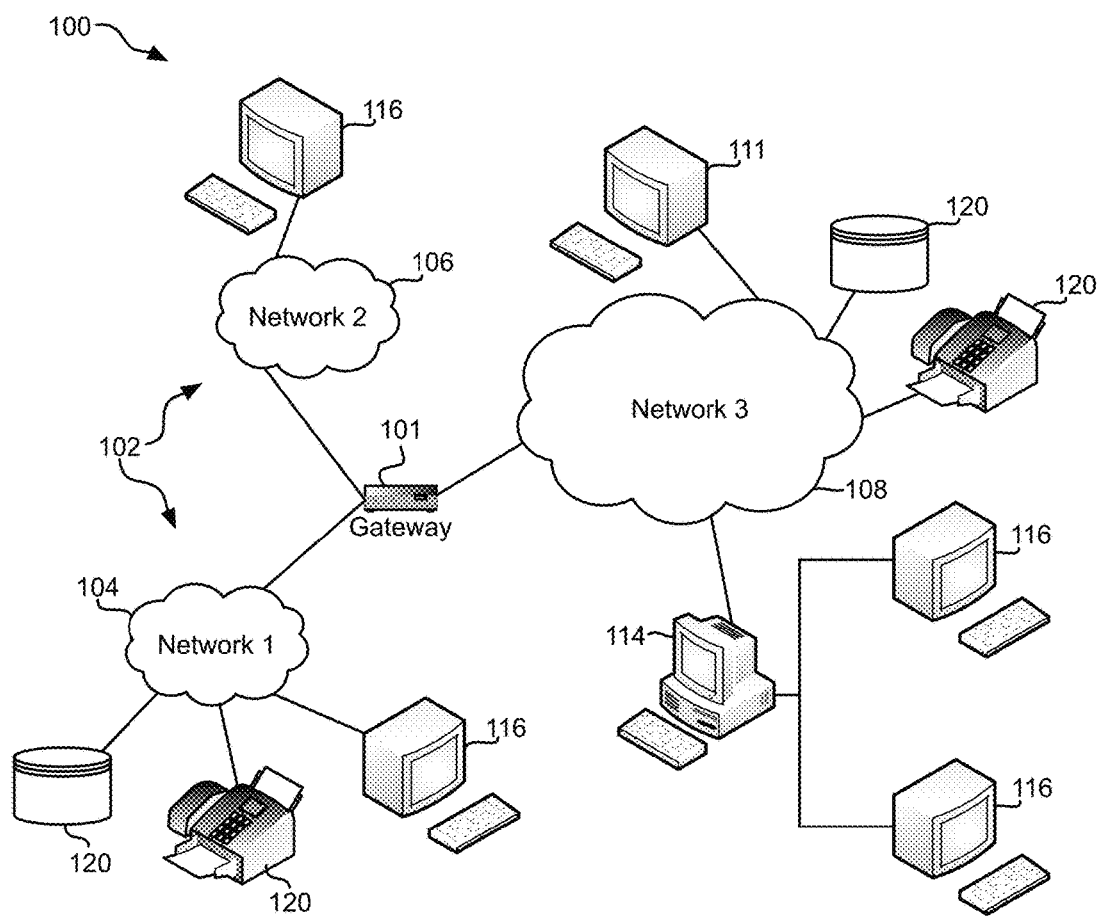
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

GENERAL EMBODIMENTS

In one general embodiment a method includes: receiving a digital image captured by a mobile device; and using a processor of the mobile device: generating a first representation of the digital image, the first representation being characterized by a reduced resolution; generating a first feature vector based on the first representation; comparing the first feature vector to a plurality of reference feature matrices; and classifying an object depicted in the digital image as a member of a particular object class based at least in part on the comparing.

In another general embodiment, a method includes: generating a first feature vector based on a digital image captured by a mobile device; comparing the first feature vector to a plurality of reference feature matrices; classifying an object depicted in the digital image as a member of a particular object class based at least in part on the comparing; and determining one or more object features of the object based at least in part on the particular object class; and performing at least one processing operation using a processor of a mobile device, the at least one processing operation selected from a group consisting of: detecting the object depicted in the digital image based at least in part on the one or more object features; rectangularizing the object depicted in the digital image based at least in part on the one or more object features; cropping the digital image based at least in part on the one or more object features; and binarizing the digital image based at least in part on the one or more object features.

In still another general embodiment, a system includes a processor; and logic in and/or executable by the processor to cause the processor to: generate a first representation of a digital image captured by a mobile device; generate a first feature vector based on the first representation; compare the first feature vector to a plurality of reference feature matrices; and classify an object depicted in the digital image as a member of a particular object class based at least in part on the comparison.

In still yet another general embodiment, a computer program product includes a computer readable storage medium having program code embodied therewith, the program code readable/executable by a processor to: generate a first representation of a digital image captured by a mobile device; generate a first feature vector based on the first representation; compare the first feature vector to a plurality of reference feature matrices; and classify an object depicted in the digital image as a member of a particular object class based at least in part on the comparison.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java. Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
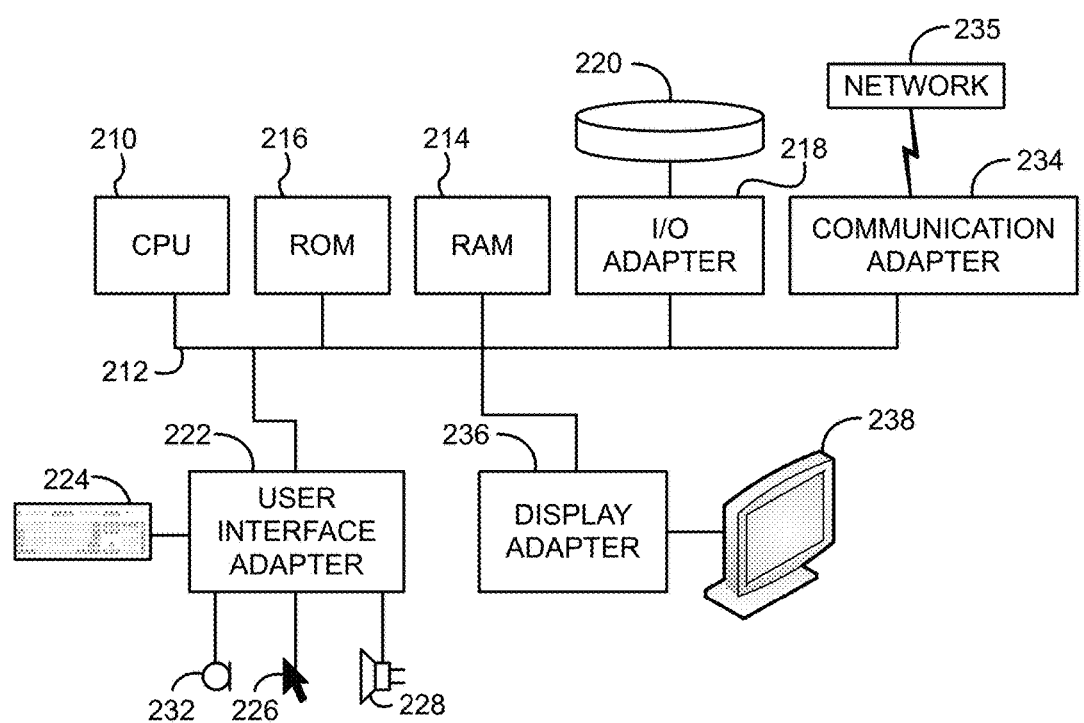
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing according to the presently disclosed algorithms may be subjected to any image processing operations disclosed in the aforementioned patent application, such as page detection, rectangularization, detection of uneven illumination, illumination normalization, resolution estimation, blur detection, etc.

In more approaches, the presently disclosed methods, systems, and/or computer program products may be utilized with, implemented in, and/or include one or more user interfaces configured to facilitate performing any functionality disclosed herein and/or in the aforementioned related patent application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent application, among others that would be appreciated by one having ordinary skill in the art upon reading these descriptions.

It will further be appreciated that embodiments presented herein may be provided in the form of a service deployed on behalf of a customer to offer service on demand.

Document Classification

Figure 5:
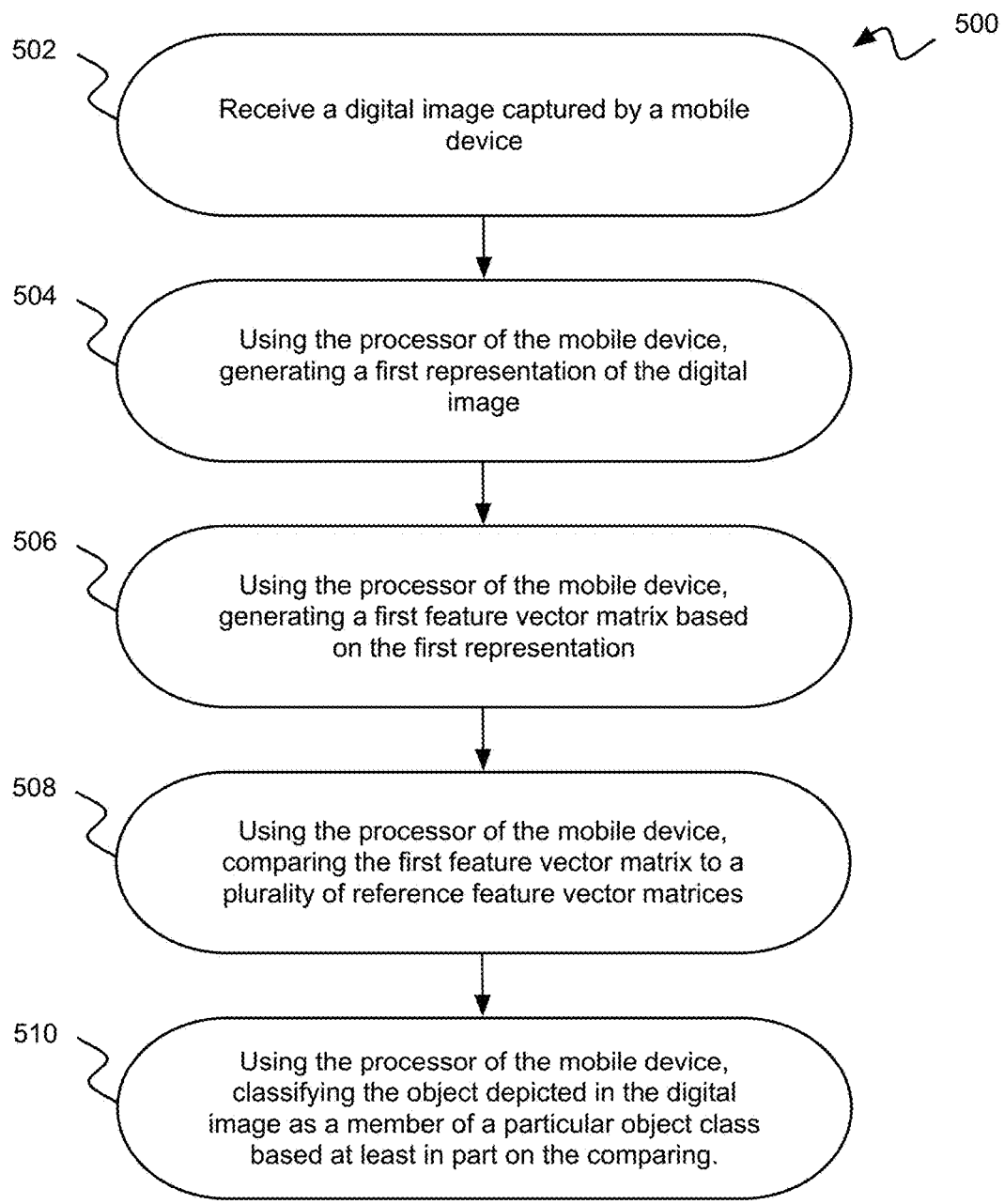
FIG. 5 is a flowchart of a method, according to one embodiment.

In accordance with one inventive embodiment commensurate in scope with the present disclosures, as shown in FIG. 5, a method 500 is shown. The method 500 may be carried out in any desired environment, and may include embodiments and/or approaches described in relation to FIGS. 1-4D, among others. Of course, more or less operations than those shown in FIG. 5 may be performed in accordance method 500 as would be appreciated by one of ordinary skill in the art upon reading the present descriptions.

In operation 502, a digital image captured by a mobile device is received.

In one embodiment the digital image may be characterized by a native resolution. As understood herein, a "native resolution" may be an original, native resolution of the image as originally captured, but also may be a resolution of the digital image after performing some pre-classification processing such as any of the image processing operations described above and in copending U.S. patent application Ser. No. 13/740,123, filed Jan. 11, 2013, a virtual re-scan (VRS) processing as disclosed in related U.S. Pat. No. 6,370,277, etc. as would be understood by one having ordinary skill in the art upon reading the present descriptions. In one embodiment, the native resolution is approximately 500 pixels by 600 pixels (i.e. a 500×600 digital image) for a digital image of a driver license subjected to processing by VRS before performing classification. Moreover, the digital image may be characterized as a color image in some approaches, and in still more approaches may be a cropped-color image, i.e. a color image depicting substantially only the object to be classified, and not depicting image background.

In operation 504, a first representation of the digital image is generated using a processor of the mobile device. The first representation may be characterized by a reduced resolution, in one approach. As understood herein, a "reduced resolution" may be any resolution less than the native resolution of the digital image, and more particularly any resolution suitable for subsequent analysis of the first representation according to the principles set forth herein.

In preferred embodiments, the reduced resolution is sufficiently low to minimize processing overhead and maximize computational efficiency and robustness of performing the algorithm on the respective mobile device, host device and/or server platform. For example, in one approach the first representation is characterized by a resolution of about 25 pixels by 25 pixels, which has been experimentally determined to be a particularly efficient and robust reduced resolution for processing of relatively small documents, such as business cards, driver licenses, receipts, etc. as would be understood by one having ordinary skill in the art upon reading the present descriptions.

Of course, in other embodiments, different resolutions may be employed without departing from the scope of the present disclosure. For example, classification of larger documents or objects may benefit from utilizing a higher resolution such as 50 pixels by 50 pixels, 100 pixels by 100 pixels, etc. to better represent the larger document or object for robust classification and maximum computational efficiency. The resolution utilized may or may not have the same number of pixels in each dimension. Moreover, the most desirable resolution for classifying various objects within a broad range of object classes may be determined experimentally according to a user's preferred balance between computational efficiency and classification robustness. In still more embodiments, any resolution may be employed, and preferably the resolution is characterized by comprising between 1 pixel and about 1000 pixels in a first dimension, and between 1 and about 1000 pixels in a second dimension.

Figure 3A:
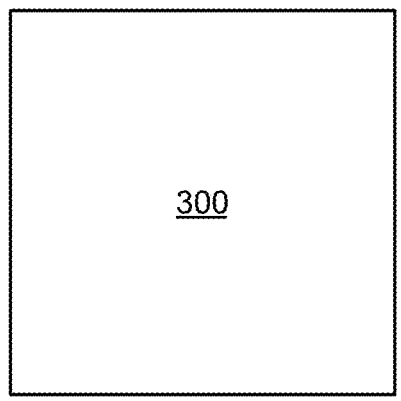
FIG. 3A depicts a digital image of an object, according to one embodiment
Figure 3B:
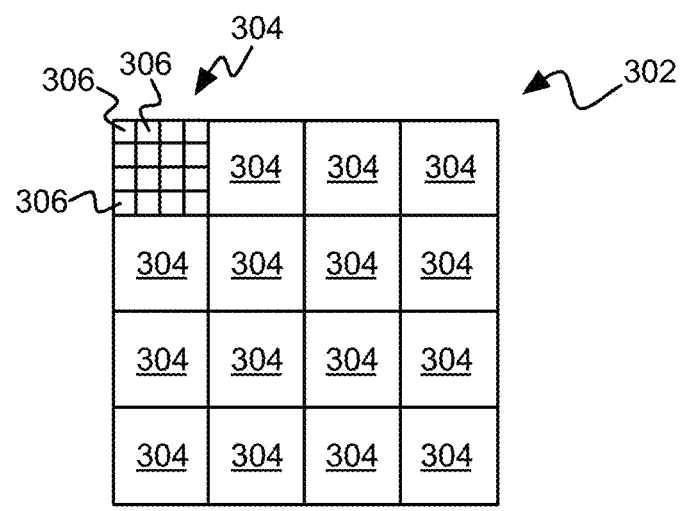
FIG. 3B depicts a schematic representation of the digital image shown in FIG. 3A divided into a plurality of sections for generating a first representation of the digital image, according to one embodiment.
Figure 3C:
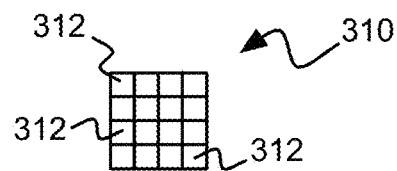
FIG. 3C is depicts a first representation of the digital image shown in FIG. 3A, the first representation being characterized by a reduced resolution relative to the resolution of the digital image.

One exemplary embodiment of inputs, outputs and/or results of a process flow for generating the first representation will now be presented with particular reference to FIGS. 3A-3C, which respectively depict: a digital image before being divided into sections (e.g. digital image 300 as shown in FIG. 3A); a digital image divided into sections (e.g. sections 304 as shown in FIG. 3B); and a first representation of the digital image (e.g. representation 310 as shown in FIG. 3C) characterized by a reduced resolution.

As shown in FIGS. 3A-3B, a digital image 300 captured by a mobile device may be divided into a plurality of sections 304. Each section may comprise a plurality of pixels 306, which may comprise a substantially rectangular grid of pixels such that the section has dimensions of $p_{S(x)}$ horizontal pixels ($p_{S(x)}$=4 as shown in FIG. 3B) by $p_{S(y)}$ vertical pixels ($p_{S(y)}$=4 as shown in FIG. 3B).

In one general embodiment, a first representation may be generated by dividing a digital image R (having a resolution of $x_R$ pixels by $y_R$ pixels) into $S_x$ horizontal sections and $S_y$ vertical sections and thus may be characterized by a reduced resolution r of $S_x$ pixels by $S_y$ pixels. Thus, generating the first representation essentially includes generating a less-granular representation of the digital image.

For example, in one approach the digital image 300 is divided into S sections, each section 304 corresponding to one portion of an s-by-s grid 302. Generating the first representation involves generating a s-pixel-by-s-pixel first representation 310, where each pixel 312 in the first representation 310 corresponds to one of the S sections 304 of the digital image, and wherein each pixel 312 is located in a position of the first representation 310 corresponding to the location of the corresponding section 304 in the digital image, i.e. the upper-leftmost pixel 312 in the first representation corresponds to the upper-leftmost section 304 in the digital image, etc.

Of course, other reduced resolutions may be employed for the first representation, ideally but not necessarily according to limitations and/or features of a mobile device, host device, and or server platform being utilized to carry out the processing, the characteristics of the digital image (resolution, illumination, presence of blur, etc.) and/or characteristics of the object which is to be detected and/or classified (contrast with background, presence of text or other symbols, closeness of fit to a general template, etc.) as would be understood by those having ordinary skill in the art upon reading the present descriptions.

In some approaches, generating the first representation may include one or more alternative and/or additional sub-operations, such as dividing the digital image into a plurality of sections. The digital image may be divided into a plurality of sections in any suitable manner, and in one embodiment the digital image is divided into a plurality of rectangular sections. Of course, sections may be characterized by any shape, and in alternative approaches the plurality of sections may or may not represent the entire digital image, may represent an oversampling of some regions of the image, or may represent a single sampling of each pixel depicted in the digital image. In a preferred embodiment, as discussed above regarding FIGS. 3A-3C, the digital image is divided into S substantially square sections 304 to form an s×s grid 302.

In further approaches, generating the first representation may also include determining, for each section of the digital image, at least one characteristic value, where each characteristic value corresponds to one or more features descriptive of the section. Within the scope of the present disclosures, any feature that may be expressed as a numerical value is suitable for use in generating the first representation, e.g. an average brightness or intensity (0-255) across each pixel in the section, an average value (0-255) of each color channel of each pixel in the section, such as an average red-channel value, and average green-channel value, and an average blue-channel value for a red-green-blue (RGB) image, etc. as would be understood by one having ordinary skill in the art upon reading the present descriptions.

With continuing reference to FIGS. 3A-3C, in some embodiments each pixel 312 of the first representation 310 corresponds to one of the S sections 304 not only with respect to positional correspondence, but also with respect to feature correspondence. For example, in one approach generating the first representation 310 may additionally include determining a characteristic section intensity value $i_S$ by calculating the average of the individual intensity values $i_P$ of each pixel 306 in the section 304. Then, each pixel 312 in the first representation 310 is assigned an intensity value equal to the average intensity value $i_S$ calculated for the corresponding section 304 of the digital image 300. In this manner, the first representation 310 reflects a less granular, normalized representation of the features depicted in digital image 300.

Of course, the pixels 312 comprising the first representation 310 may be represented using any characteristic value or combination of characteristic values without departing from the scope of the presently disclosed classification methods. Further, characteristic values may be computed and/or determined using any suitable means, such as by random selection of a characteristic value from a distribution of values, by a statistical means or measure, such as an average value, a spread of values, a minimum value, a maximum value, a standard deviation of values, a variance of values, or by any other means that would be known to a skilled artisan upon reading the instant descriptions.

In operation 506, a first feature vector is generated based on the first representation.

The first feature vector and/or reference feature matrices may include a plurality of feature vectors, where each feature vector corresponds to a characteristic of a corresponding object class, e.g. a characteristic minimum, maximum, average, etc. brightness in one or more color channels at a particular location (pixel or section), presence of a particular symbol or other reference object at a particular location, dimensions, aspect ratio, pixel density (especially black pixel density, but also pixel density of any other color channel), etc.

As would be understood by one having ordinary skill in the art upon reading the present descriptions, feature vectors suitable for inclusion in first feature vector and/or reference feature matrices comprise any type, number and/or length of feature vectors, such as described in U.S. patent application Ser. No. 12/042,774, filed Mar. 5, 2008; and Ser. No. 12/368,685, filed Feb. 10, 2009 and/or U.S. Pat. No. 7,761,391, granted Jul. 20, 2010 (U.S. patent application Ser. No. 11/752,364, filed May 13, 2007).

In operation 508, the first feature vector is compared to a plurality of reference feature matrices.

The comparing operation 508 may be performed according to any suitable vector matrix comparison, such as described in U.S. patent application Ser. No. 12/042,774, filed Mar. 5, 2008; and Ser. No. 12/368,685, filed Feb. 10, 2009 and U.S. Pat. No. 7,761,391, granted Jul. 20, 2010 (U.S. patent application Ser. No. 11/752,364, filed May 13, 2007).

Thus, in such approaches the comparing may include an N-dimensional feature space comparison. In at least one approach, N is greater than 50, but of course, N may be any value sufficiently large to ensure robust classification of objects into a single, correct object class, which those having ordinary skill in the art reading the present descriptions will appreciate to vary according to many factors, such as the complexity of the object, the similarity or distinctness between object classes, the number of object classes, etc.

As understood herein, "objects" include any tangible thing represented in an image and which may be described according to at least one unique characteristic such as color, size, dimensions, shape, texture, or representative feature(s) as would be understood by one having ordinary skill in the art upon reading the present descriptions. Additionally, objects include or classified according to at least one unique combination of such characteristics. For example, in various embodiments objects may include but are in no way limited to persons, animals, vehicles, buildings, landmarks, documents, furniture, plants, etc. as would be understood by one having ordinary skill in the art upon reading the present descriptions.

For example, in one embodiment where attempting to classify an object depicted in a digital image as one of only a small number of object classes (e.g. 3-5 object classes), each object class being characterized by a significant number of starkly distinguishing features or feature vectors (e.g. each object class corresponding to an object or object(s) characterized by very different size, shape, color profile and/or color scheme and easily distinguishable reference symbols positioned in unique locations on each object class, etc.), a relatively low value of N may be sufficiently large to ensure robust classification.

On the other hand, where attempting to classify an object depicted in a digital image as one of a large number of object classes (e.g. 30 or more object classes), and each object class is characterized by a significant number of similar features or feature vectors, and only a few distinguishing features or feature vectors, a relatively high value of N may be preferable to ensure robust classification. Similarly, the value of N is preferably chosen or determined such that the classification is not only robust, but also computationally efficient; i.e. the classification process(es) introduce only minimal processing overhead to the device(s) or system(s) utilized to perform the classification algorithm.

The value of N that achieves the desired balance between classification robustness and processing overhead will depend on many factors such as described above and others that would be appreciated by one having ordinary skill in the art upon reading the present descriptions. Moreover, determining the appropriate value of N to achieve the desired balance may be accomplished using any known method or equivalent thereof as understood by a skilled artisan upon reading the instant disclosures.

In a concrete implementation, directed to classifying driver licenses according to state and distinguishing driver licenses from myriad other document types, it was determined that a 625-dimensional comparison (N=625) provided a preferably robust classification without introducing unsatisfactorily high overhead to processing performed using a variety of current-generation mobile devices.

In operation 510, an object depicted in the digital image is classified as a member of a particular object class based at least in part on the comparing operation 508. More specifically, the comparing operation 508 may involve evaluating each feature vector of each reference feature matrix, or alternatively evaluating a plurality of feature matrices for objects belonging to a particular object class, and identifying a hyper-plane in the N-dimensional feature space that separates the feature vectors of one reference feature matrix from the feature vectors of other reference feature matrices. In this manner, the classification algorithm defines concrete hyper-plane boundaries between object classes, and may assign an unknown object to a particular object class based on similarity of feature vectors to the particular object class and/or dissimilarity to other reference feature matrix profiles.

In the simplest example of such feature-space discrimination, imagining a two-dimensional feature space with one feature plotted along the ordinate axis and another feature plotted along the abscissa, objects belonging to one particular class may be characterized by feature vectors having a distribution of values clustered in the lower-right portion of the feature space, while another class of objects may be characterized by feature vectors exhibiting a distribution of values clustered in the upper-left portion of the feature space, and the classification algorithm may distinguish between the two by identifying a line between each cluster separating the feature space into two classes—"upper left" and "lower-right." Of course, as the number of dimensions considered in the feature space increases, the complexity of the classification grows rapidly, but also provides significant improvements to classification robustness, as will be appreciated by one having ordinary skill in the art upon reading the present descriptions.

Additional Processing

In some approaches, classification according to embodiments of the presently disclosed methods may include one or more additional and/or alternative features and/or operations, such as described below.

In one embodiment, classification such as described above may additionally and/or alternatively include assigning a confidence value to a plurality of putative object classes based on the comparing operation (e.g. as performed in operation 508 of method 500) the presently disclosed classification methods, systems and/or computer program products may additionally and/or alternatively determine a location of the mobile device, receive location information indicating the location of the mobile device, etc. and based on the determined location, a confidence value of a classification result corresponding to a particular location may be adjusted. For example, if a mobile device is determined to be located in a particular state (e.g. Maryland) based on a GPS signal, then during classification, a confidence value may be adjusted for any object class corresponding to the particular state (e.g. Maryland Driver License, Maryland Department of Motor Vehicle Title/Registration Form, Maryland Traffic Violation Ticket, etc. as would be understood by one having ordinary skill in the art upon reading the present descriptions).

Confidence values may be adjusted in any suitable manner, such as increasing a confidence value for any object class corresponding to a particular location, decreasing a confidence value for any object class not corresponding to a particular location, normalizing confidence value(s) based on correspondence/non-correspondence to a particular location, etc. as would be understood by the skilled artisan reading the present disclosures.

The mobile device location may be determined using any known method, and employing hardware components of the mobile device or any other number of devices in communication with the mobile device, such as one or more satellites, wireless communication networks, servers, etc. as would be understood by one having ordinary skill in the art upon reading the present descriptions.

For example, the mobile device location may be determined based in whole or in part on one or more of a global-positioning system (GPS) signal, a connection to a wireless communication network, a database of known locations (e.g. a contact database, a database associated with a navigational tool such as Google Maps, etc.), a social media tool (e.g. a "check-in" feature such as provided via Facebook, Google Plus, Yelp, etc.), an IP address, etc. as would be understood by one having ordinary skill in the art upon reading the present descriptions.

In more embodiments, classification additionally and/or alternatively includes outputting an indication of the particular object class to a display of the mobile device; and receiving user input via the display of the mobile device in response to outputting the indication. While the user input may be of any known type and relate to any of the herein described features and/or operations, preferably user input relates to confirming, negating or modifying the particular object class to which the object was assigned by the classification algorithm.

The indication may be output to the display in any suitable manner, such as via a push notification, text message, display window on the display of the mobile device, email, etc. as would be understood by one having ordinary skill in the art. Moreover, the user input may take any form and be received in any known manner, such as detecting a user tapping or pressing on a portion of the mobile device display (e.g. by detecting changes in resistance, capacitance on a touch-screen device, by detecting user interaction with one or more buttons or switches of the mobile device, etc.)

In one embodiment, classification further includes determining one or more object features of a classified object based at least in part on the particular object class. Thus, classification may include determining such object features using any suitable mechanism or approach, such as receiving an object class identification code and using the object class identification code as a query and/or to perform a lookup in a database of object features organized according to object class and keyed, hashed, indexed, etc. to the object class identification code.

Object features within the scope of the present disclosures may include any feature capable of being recognized in a digital image, and preferably any feature capable of being expressed in a numerical format (whether scalar, vector, or otherwise), e.g. location of subregion containing reference object(s) (especially in one or more object orientation states, such as landscape, portrait, etc.) object color profile, or color scheme, object subregion color profile or color scheme, location of text, etc. as would be understood by one having ordinary skill in the art upon reading the present descriptions.

Figure 6:
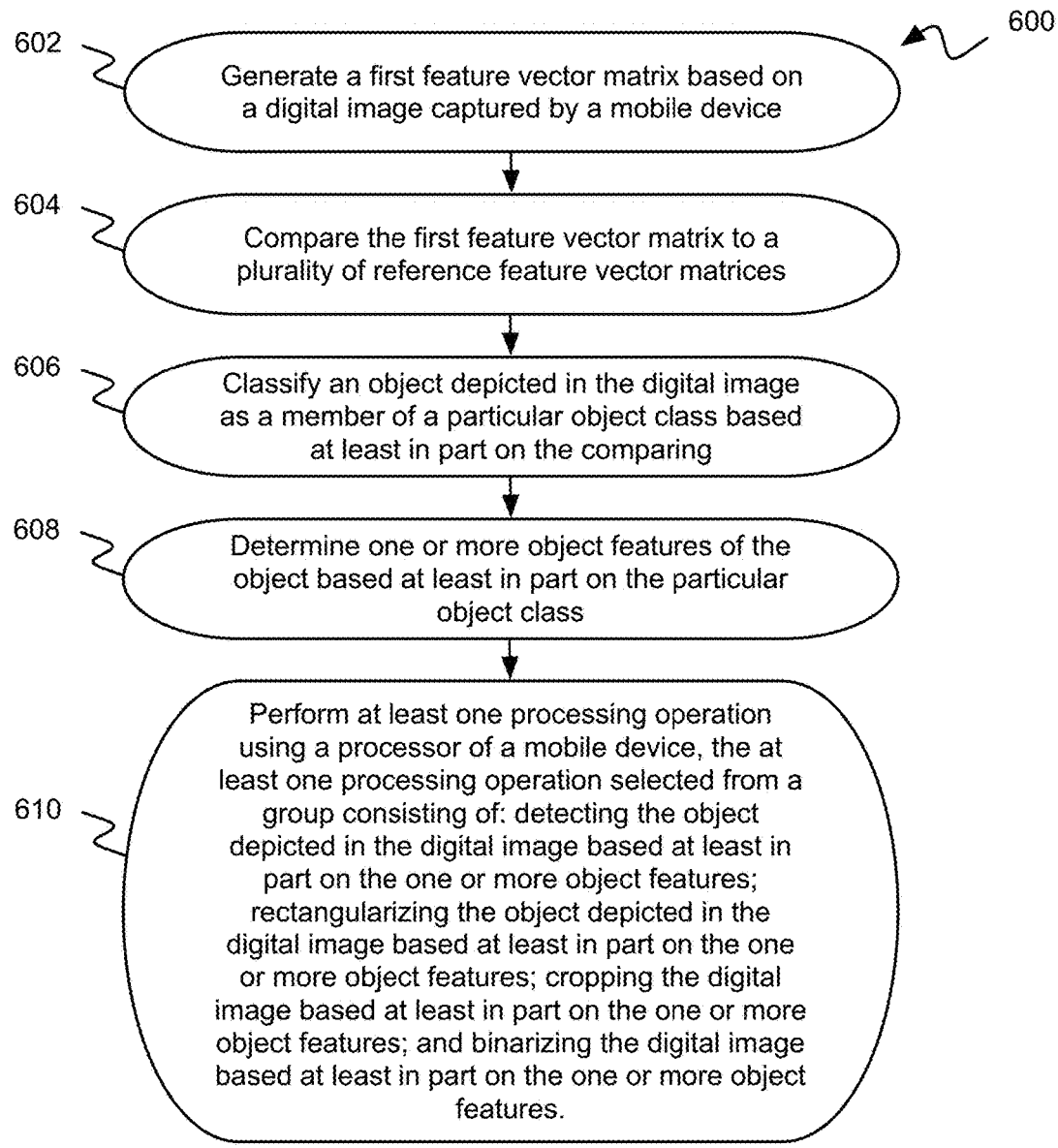
FIG. 6 is a flowchart of a method, according to one embodiment.

In accordance with another inventive embodiment commensurate in scope with the present disclosures, as shown in FIG. 6, a method 600 is shown. The method 600 may be carried out in any desired environment, and may include embodiments and/or approaches described in relation to FIGS. 1-4D, among others. Of course, more or less operations than those shown in FIG. 6 may be performed in accordance method 600 as would be appreciated by one of ordinary skill in the art upon reading the present descriptions.

In operation 602, a first feature vector is generated based on a digital image captured by a mobile device.

In operation 604, the first feature vector is compared to a plurality of reference feature matrices.

In operation 606, an object depicted in the digital image is classified as a member of a particular object class based at least in part on the comparing (e.g. the comparing performed in operation 604).

In operation 608, one or more object features of the object are determined based at least in part on the particular object class.

In operation 610, a processing operation is performed. The processing operation includes performing one or more of the following subprocesses: detecting the object depicted in the digital image based at least in part on the one or more object features; rectangularizing the object depicted in the digital image based at least in part on the one or more object features; cropping the digital image based at least in part on the one or more object features; and binarizing the digital image based at least in part on the one or more object features.

As will be further appreciated by one having ordinary skill in the art upon reading the above descriptions of document classification, in various embodiments it may be advantageous to perform one or more additional processing operations, such as the subprocesses described above with reference to operation 610, on a digital image based at least in part on object features determined via document classification.

For example, after classifying an object depicted in a digital image, such as a document, it may be possible to refine other processing parameters, functions. etc. and/or utilize information known to be true for the class of objects to which the classified object belongs, such as object shape, size, dimensions, location of regions of interest on and/or in the object, such as regions depicting one or more symbols, patterns, text, etc. as would be understood by one having ordinary skill in the art upon reading the present descriptions.

Regarding performing page detection based on classification, it may be advantageous in some approaches to utilize information known about an object belonging to a particular object class in order to improve object detection capabilities. For example, and as would be appreciated by one having ordinary skill in the art, it may be less computationally expensive, and/or may result in a higher-confidence or higher-quality result to narrow a set of characteristics that may potentially identify an object in a digital image to one or a few discrete, known characteristics, and simply search for those characteristic(s).

Exemplary characteristics that may be utilized to improve object detection may include characteristics such as object dimensions, object shape, object color, one or more reference features of the object class (such as reference symbols positioned in a known location of a document).

In another approach, object detection may be improved based on the one or more known characteristics by facilitating an object detection algorithm distinguishing regions of the digital image depicting the object from regions of the digital image depicting other objects, image background, artifacts, etc. as would be understood by one having ordinary skill in the art upon reading the present descriptions. For example, if objects belonging to a particular object class are known to exhibit a particular color profile or scheme, it may be simpler and/or more reliable to attempt detecting the particular color profile or scheme within the digital image rather than detecting a transition from one color profile or scheme (e.g. a background color profile or scheme) to another color profile or scheme (e.g. the object color profile or scheme), especially if the two colors profiles or schemes are not characterized by sharply contrasting features.

Regarding performing rectangularization based on classification, it may be advantageous in some approaches to utilize information known about an object belonging to a particular object class in order to improve object rectangularization capabilities. For example, and as would be appreciated by one having ordinary skill in the art, it may be less computationally expensive, and/or may result in a higher-confidence or higher-quality result to transform a digital representation of an object from a native appearance to a true configuration based on a set of known object characteristics that definitively represent the true object configuration, rather than attempting to estimate the true object configuration from the native appearance and project the native appearance onto an estimated object configuration.

In one approach, the classification may identify known dimensions of the object, and based on these known dimensions the digital image may be rectangularized to transform a distorted representation of the object in the digital image into an undistorted representation (e.g. by removing projective effects introduced in the process of capturing the image using a camera of a mobile device rather than a traditional flat-bed scanner, paper-feed scanner or other similar multi-function peripheral (MFP)).

Regarding performing cropping based on classification, and similar to the principles discussed above regarding rectangularization, it may be advantageous in some approaches to utilize information known about an object belonging to a particular object class to improve cropping of digital images depicting the object such that all or significantly all of the cropped image depicts the object and not image background (or other objects, artifacts, etc. depicted in the image).

As a simple example, it may be advantageous to determine an object's known size, dimensions, configuration, etc. according to the object classification and utilize this information to identify a region of the image depicting the object from regions of the image not depicting the object, and define crop lines surrounding the object to remove the regions of the image not depicting the object.

Regarding performing binarization based on classification, the presently disclosed classification algorithms provide several useful improvements to mobile image processing. Several exemplary embodiments of such improvements will now be described with reference to FIGS. 4A-4D.

For example, binarization algorithms generally transform a multi-tonal digital image (e.g. grayscale, color, or any other image such as image 400 exhibiting more than two tones) into a bitonal image, i.e. an image exhibiting only two tones (typically white and black). Those having ordinary skill in the art will appreciate that attempting to binarize a digital image depicting an object with regions exhibiting two or more distinct color profiles and/or color schemes (e.g. a region depicting a color photograph 402 as compared to a region depicting a black/white text region 404, a color-text region 406, a symbol 408 such as a reference object, watermark, etc. object background region 410, etc.) may produce an unsuccessful or unsatisfactory result.

As one explanation, these difficulties may be at least partially due to the differences between the color profiles, schemes, etc., which counter-influence a single binarization transform. Thus, providing an ability to distinguish each of these regions having disparate color schemes or profiles and define separate binarization parameters for each may greatly improve the quality of the resulting bitonal image as a whole and with particular respect to the quality of the transformation in each respective region.

According to one exemplary embodiment shown in FIGS. 4A-4B, improved binarization may include determining an object class color profile and/or scheme (e.g. determining a color profile and/or color scheme for object background region 410); adjusting one or more binarization parameters based on the object class color profile and/or color scheme; and thresholding the digital image using the one or more adjusted binarization parameters.

Binarization parameters may include any parameter of any suitable binarization process as would be appreciated by those having ordinary skill in the art reading the present descriptions, and binarization parameters may be adjusted according to any suitable methodology. For example, with respect to adjusting binarization parameters based on an object class color profile and/or color scheme, binarization parameters may be adjusted to over- and/or under-emphasize a contribution of one or more color channels, intensities, etc. in accordance with the object class color profile/scheme (such as under-emphasizing the red channel for an object class color profile/scheme relatively saturated by red hue(s), etc.).

Similarly, in other embodiments such as particularly shown in FIGS. 4B-4D, improved binarization may include determining an object class mask, applying the object class mask to the digital image and thresholding a subregion of the digital image based on the object class mask. The object class mask may be any type of mask, with the condition that the object class mask provides information regarding the location of particular regions of interest characteristic to objects belonging to the class (such as a region depicting a color photograph 402, a region depicting a black/white text region 404, a color-text region 406, a symbol region depicting a symbol 408 such as a reference object, watermark, etc., an object background region 410, etc.) and enabling the selective inclusion and/or exclusion of such regions from the binarization operation(s).

For example, as shown in FIG. 4B, improved binarization includes determining an object class mask 420 identifying regions such as discussed immediately above and applying the object class mask 420 to exclude from binarization all of the digital image 400 except a single region of interest, such as object background region 410. Alternatively the entire digital image may be masked-out and a region of interest such as object background region 410 subsequently masked-in to the binarization process. Moreover, in either event the masking functionality now described with reference to FIG. 4B may be combined with the exemplary color profile and/or color scheme information functionality described above, for example by obtaining both the object class mask and the object color profile and/or color scheme, applying the object class mask to exclude all of the digital image from binarization except object background region 410, adjusting one or more binarization parameters based on the object background region color profile and/or color scheme, and thresholding the object background region 410 using the adjusted binarization parameters.

Extending the principle shown in FIG. 4B, multiple regions of interest may be masked-in and/or masked-out using object class mask 420 to selectively designate regions and/or parameters for binarization in a layered approach designed to produce high-quality bitonal images. For example, as shown in FIG. 4C multiple text regions 404, 406 may be retained for binarization (potentially using adjusted parameters) after applying object class mask 420, for example to exclude all non-text regions from binarization, in some approaches.

Similarly, it may be advantageous to simply exclude only a portion of an image from binarization, whether or not adjusting any parameters. For example, with reference to FIG. 4D, it may be desirable to mask-out a unique region of a digital image 400, such as a region depicting a color photograph 402, using an object class mask 420. Then, particularly in approaches where the remaining portion of the digital image 400 is characterized by a single color profile and/or color scheme, or a small number (i.e. no more than 3) substantially similar color profile and/or color schemes, binarization may be performed to clarify the remaining portions of the digital image 400. Subsequently, the masked-out unique region may optionally be restored to the digital image 400, with the result being an improved bitonal image quality in all regions of the digital image 400 that were subjected to binarization coupled with an undisturbed color photograph 402 in the region of the image not subjected to binarization.

In still more embodiments, it may be advantageous to perform optical character recognition (OCR) based at least in part on the classification and/or result of classification. Specifically, it may be advantageous to determine information about the location, format, and/or content of text depicted in objects belonging to a particular class, and modify predictions estimated by traditional OCR methods based on an expected text location, format and/or content. For example, in one embodiment where an OCR prediction estimates text in a region corresponding to a "date" field of a document reads "Jan. 14, 201l" the presently disclosed algorithms may determine the expected format for this text follows a format such as "[Abbreviated Month][.][##][,] [####]" the algorithm may correct the erroneous OCR predictions, e.g. converting the comma after "Jan" into a period and/or converting the letter "l" at the end of "201l" into a numerical one character. Similarly, the presently disclosed algorithms may determine the expected format for the same text is instead "[##]/[##]/[####]" and convert "Jan" to "01" and convert each set of comma-space characters "," into a slash "/" to correct the erroneous OCR predictions.

Of course, other methods of improving upon and/or correcting OCR predictions that would be appreciated by the skilled artisan upon reading these descriptions are also fully within the scope of the present disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving a digital image captured by a mobile device; and
using a processor of the mobile device:
generating a first representation of the digital image, the first representation being characterized by a reduced resolution;
generating a first feature vector based on the first representation;
comparing the first feature vector to a plurality of reference feature matrices;
classifying an object depicted in the digital image as a member of a particular object class based at least in part on the comparing;
determining one or more object features of the object based at least in part on the particular object class; and
detecting the object within the digital image based on the one or more object features, wherein the detecting comprises directly detecting an object color profile within the digital image rather than detecting a transition from a first color profile to a second color profile.

2. The method as recited in claim 1, comprising:
receiving an object class identification code; and
retrieving the one or more object features based on the object class identification code.

3. The method as recited in claim 1, wherein the one or more object features comprise a location of a subregion of the digital image, the subregion depicting one or more reference objects.

4. The method as recited in claim 3, wherein the location corresponds to a particular object orientation state.

5. The method as recited in claim 1, wherein the one or more object features are selected from a group consisting of: an object color profile; and an object subregion color profile.

6. The method as recited in claim 1, wherein the one or more object features comprise a location of text depicted within the object.

7. The method as recited in claim 1, wherein the one or more object features are selected from a group consisting of: one or more dimensions of the object; an object shape; an object color; and one or more reference features of the object class.

8. The method as recited in claim 1, comprising rectangularizing the object based at least in part on the one or more object features.

9. The method as recited in claim 8, wherein the one or more object features comprise one or more known characteristics describing a true configuration of the object.

10. The method as recited in claim 9, wherein the rectangularizing comprises transforming the object from a native appearance within the digital image to the true configuration based at least in part on the known characteristics, rather than estimating the true configuration based on the native appearance of the object within the digital image.

11. The method as recited in claim 1, comprising predicting an identity of text depicted on the object using optical character recognition (OCR), wherein the predicting is based at least in part on the particular object class.

12. The method as recited in claim 11, comprising modifying at least one identity predicted using OCR, the modifying being based at least in part on an expected format of text depicted on the object; and
wherein the expected format is determined based on the particular object class.

13. The method as recited in claim 1, comprising cropping the digital image based at least in part on the one or more object features.

14. A computer program product, comprising a non-transitory computer readable medium having stored thereon program instructions readable/executable by a processor of a mobile device to cause the processor to:
generate a first representation of a digital image, the first representation being characterized by a reduced resolution;
generate a first feature vector based on the first representation; compare the first feature vector to a plurality of reference feature matrices;
classify an object depicted in the digital image as a member of a particular object class based at least in part on the comparing; and
determine one or more object features of the object based at least in part on the particular object class; and
detect the object within the digital image based on the one or more object features, wherein the detecting comprises directly detecting an object color profile within the digital image rather than detecting a transition from a first color profile to a second color profile.

15. The computer program product as recited in claim 14, wherein the one or more object features are selected from a group consisting of: one or more dimensions of the object; an object shape; an object color; and one or more reference features of the object class.

16. A computer-implemented method, comprising:
receiving a digital image captured by a mobile device; and
using a processor of the mobile device:
generating a first representation of a digital image, the first representation being characterized by a reduced resolution;
generating a first feature vector based on the first representation;
comparing the first feature vector to a plurality of reference feature matrices;
classifying an object depicted in the digital image as a member of a particular object class based at least in part on the comparing; and
determining one or more object features of the object based at least in part on the particular object class;
predicting an identity of text depicted on the object using optical character recognition (OCR), wherein the predicting is based at least in part on the particular object class; and
modifying at least one identity predicted using OCR, the modifying being based at least in part on an expected format of text depicted on the object, wherein the expected format is determined based on the particular object class.

17. A computer program product, comprising a non-transitory computer readable medium having stored thereon program instructions readable/executable by a processor of a mobile device to cause the processor to:
generate a first representation of a digital image, the first representation being characterized by a reduced resolution;
generate a first feature vector based on the first representation;
compare the first feature vector to a plurality of reference feature matrices;
classify an object depicted in the digital image as a member of a particular object class based at least in part on the comparing; and determine one or more object features of the object based at least in part on the particular object class;

predict an identity of text depicted on the object using optical character recognition (OCR), wherein the predicting is based at least in part on the particular object class; and modify at least one identity predicted using OCR, the modifying being based at least in part on an expected format of text depicted on the object, wherein the expected format is determined based on the particular object class.

* * * * *